US007209582B2

(12) United States Patent
Takahashi

(10) Patent No.: US 7,209,582 B2
(45) Date of Patent: Apr. 24, 2007

(54) COIN DISCRIMINATING METHOD AND APPARATUS

(75) Inventor: Masataka Takahashi, Chiba (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 814 days.

(21) Appl. No.: 10/633,987

(22) Filed: Aug. 4, 2003

(65) Prior Publication Data

US 2004/0120567 A1 Jun. 24, 2004

(30) Foreign Application Priority Data

Aug. 9, 2002 (JP) ............................. 2002-232988

(51) Int. Cl.
*G06K 9/20* (2006.01)
*G07D 5/00* (2006.01)
*G06K 9/46* (2006.01)

(52) U.S. Cl. ...................... 382/136; 194/302; 194/317; 194/328; 194/330

(58) Field of Classification Search ................ 382/136, 382/270; 194/317, 318, 328, 207, 330, 302; 235/379
See application file for complete search history.

(56) References Cited

U.S. PATENT DOCUMENTS 5,144,495 A 9/1992 Merton et al.
6,328,150 B1 12/2001 Hibari
2002/0005329 A1 1/2002 Sugata et al.
2002/0037096 A1* 3/2002 Sugata ....................... 382/136

FOREIGN PATENT DOCUMENTS

EP 1 077 434 A1 8/2000
JP 09 305768 A 2/1998

* cited by examiner

*Primary Examiner*—Jeffrey Stucker
*Assistant Examiner*—Ehsan Mafi
(74) *Attorney, Agent, or Firm*—Cohen Pontani Lieberman & Pavane LLP

(57) ABSTRACT

A coin discriminating method includes steps of irradiating a surface of a coin with light, photoelectrically detecting light reflected by the surface of the coin, producing detected pattern data of the surface of the coin, binarizing corresponding reference pattern data so that “1” is assigned to pixel data having a signal intensity level equal to or higher than a predetermined signal intensity level and “0” is assigned to pixel data having a signal intensity level lower than the predetermined signal intensity level to produce reference bright portion pattern data consisting of “1” pixel data and reference dark portion pattern data consisting of “0” pixel data, extracting bright portion pattern data consisting of pixels corresponding to pixels included in the reference bright portion pattern data and dark portion pattern data consisting of pixels corresponding to pixels included in the reference dark portion pattern data from the detected pattern data, and discriminating whether or not the surface of the coin is damaged to higher than the predetermined level by comparing the difference between the bright portion data signal intensity average value and dark portion data signal intensity average value with a threshold value of coins of a corresponding denomination.

25 Claims, 15 Drawing Sheets

COIN DISCRIMINATING METHOD AND APPARATUS

BACKGROUND OF THE INVENTION

The present invention relates to a coin discriminating method and apparatus and, in particular, to a coin discriminating method and apparatus for reliably discriminating whether or not coins are acceptable, the denominations of coins and whether or not coins are damaged to higher than a predetermined level by optically detecting coin surface patterns while preventing the apparatus from becoming large.

DESCRIPTION OF THE PRIOR ART

There is known a coin discriminating apparatus for discriminating whether or not coins are acceptable, namely, the genuineness of coins, whether or not coins are currently in circulation and the denomination of coins, and discriminating whether or not coins are damaged to higher than a predetermined level.

Japanese Patent Application Laid Open No. 2000-306135 discloses a coin discriminating apparatus which discriminates whether or not coins are acceptable and the denomination of coins by optically detecting surface patterns of coins and discriminates whether or not coins are damaged to higher than a predetermined level by producing color image data of the surfaces of coins using a color sensor.

Specifically, the coin discriminating apparatus is constituted so as to discriminate whether or not a coin is acceptable and the denomination of the coin by projecting light onto one surface of the coin from a first light source, detecting reflected light by a first light receiving means to produce pattern data of the one surface of the coin, projecting light onto the other surface of a coin from a second light source, detecting reflected light by a second light receiving means to produce pattern data of the other surface of the coin, and comparing the pattern data of both surfaces of the coin with reference data for each denomination of coins, and discriminate whether or not a coin is damaged to higher than a predetermined level by projecting white light onto one surface of the coin from a first white light source, detecting reflected light by a first color sensor to produce color image data of the one surface of the coin, projecting white light onto the other surface of the coin from a second white light source, detecting reflected light by a second color sensor to produce color image data of the other surface of the coin, and comparing color image data of both surfaces of the coin with reference color image data of coins of the denomination discriminated based on the pattern data of both surfaces of the coin.

However, in the case of discriminating whether or not coins are acceptable and the denomination of coins by comparing the pattern data of both surfaces of the coin with reference data for each denomination of coins and further discriminating whether or not coins are damaged to higher than a predetermined level by comparing color image data of both surfaces of the coin with reference color image data of coins of the denomination discriminated based on the pattern data of both surfaces of the coin, it is necessary to install the first light source, the second light source, the first white light source, the second white light source, the first light receiving means, the second light receiving means, the first color sensor and the second color sensor along a coin transportation passage. The coin discriminating apparatus therefore inevitably becomes large.

SUMMARY OF THE INVENTION

It is therefore an object of the present invention to provide a coin discriminating method and apparatus and, in particular, to provide a coin discriminating method and apparatus for reliably discriminating whether or not coins are acceptable, the denominations of coins and whether or not coins are damaged to higher than a predetermined level by optically detecting coin surface patterns while preventing the apparatus from becoming large.

The above and other objects of the present invention can be accomplished by a method for discriminating coins comprising steps of irradiating a surface of a coin with light, photoelectrically detecting light reflected by the surface of the coin, producing detected pattern data of the surface of the coin, binarizing corresponding reference pattern data so that "1" is assigned to pixel data having a signal intensity level equal to or higher than a predetermined signal intensity level and "0" is assigned to pixel data having a signal intensity level lower than the predetermined signal intensity level to produce reference bright portion pattern data consisting of "1" pixel data and reference dark portion pattern data consisting of "0" pixel data, extracting, based on the thus produced reference bright portion pattern data and reference dark portion pattern data, bright portion pattern data consisting of pixels corresponding to pixels included in the reference bright portion pattern data and dark portion pattern data consisting of pixels corresponding to pixels included in the reference dark portion pattern data from the detected pattern data, averaging signal intensity levels of the pixels included in the bright portion pattern data to calculate a bright portion data signal intensity average value, averaging signal intensity levels of the pixels included in the dark portion pattern data to calculate a dark portion data signal intensity average value, calculating a difference between the bright portion data signal intensity average value and dark portion data signal intensity average value, comparing it with a threshold value of coins of a corresponding denomination among threshold values defined for each denomination, and discriminating that a damage level of the surface of the coin is equal to or lower than a predetermined level when the difference between the bright portion data signal intensity average value and dark portion data signal intensity average value is equal to or larger than the threshold value and discriminating that the surface of the coin is damaged to higher than the predetermined level when the difference between the bright portion data signal intensity average value and dark portion data signal intensity average value is smaller than the threshold value.

In a study done by the inventors of the present invention, it was found that the intensity of light reflected from an edge portion of a coin is generally high but when the coin has been in circulation for a long time and damaged, the resulting wear of the edge portion of the coin causes the bright portion data signal intensity average value obtained from the damaged coin to be lower than that obtained from an undamaged coin, and that, on the other hand, the intensity of light reflected from a flat portion of a coin is generally low but when the coin has been in circulation for a long time and damaged, the resulting irregular light reflection owing to scratching and/or staining of the flat portion of the coin causes the dark portion data signal intensity average value obtained from the damaged coin to be higher than that obtained from an undamaged coin. Therefore, since the bright portion data signal intensity average value becomes lower as the damage level of a coin increases and, on the other hand, the dark portion data signal intensity average value becomes higher as the damage level of a coin increases, it is possible to discriminate, based on the bright portion data signal intensity average value and the dark portion data signal intensity average value, whether or not the coin is damaged to higher than a predetermined level with extremely high accuracy, and since the method for discriminating coins according to the present invention includes the steps of calculating a difference between the bright portion data signal intensity average value and dark portion data signal intensity average value, comparing it with a threshold value of coins of a corresponding denomination among threshold values defined for each denomination, and discriminating that the damage level of the surface of the coin is equal to or lower than a predetermined level when the difference between the bright portion data signal intensity average value and dark portion data signal intensity average value is equal to or larger than the threshold value and discriminating that the surface of the coin is damaged to higher than the predetermined level when the difference between the bright portion data signal intensity average value and dark portion data signal intensity average value is smaller than the threshold value, it is possible to discriminate whether or not the coin is damaged to higher than a predetermined level with extremely high accuracy.

Further, according to the present invention, in the case where whether or not a coin is acceptable and the denomination of the coin are discriminated by irradiating the surface of the coin with light, photoelectrically detecting light reflected by the surface of the coin and producing detected pattern data of the surface of the coin, since it is possible to discriminate whether or not the coin is damaged to higher than a predetermined level using the pattern data of the surface of the coin used for discriminating whether or not the coin is acceptable and the denomination of the coin, it is possible to discriminate whether or not the coin is acceptable, the denomination of the coin and whether or not the coin is damaged to higher than the predetermined level without making the coin discriminating apparatus larger.

In a preferred aspect of the present invention, the method for discriminating coins further comprises steps of calculating the sum of the bright portion signal intensity average value and dark portion signal intensity average value and estimating the sum of the bright portion signal intensity average value and dark portion signal intensity average value in accordance with an algorithm for the corresponding denomination, thereby discriminating whether or not the coin is damaged to higher than the predetermined level.

In a study done by the inventors of the present invention, it was found that in the case where a coin is made of a cupronickel system material, a brass system material or a bronze system material, the sum of the bright portion signal intensity average value and dark portion signal intensity average value of a coin whose damage level is low is large and the sum of the bright portion signal intensity average value and dark portion signal intensity average value becomes smaller as the damage level of a coin increases and, on the other hand, that in the case where a coin is made of aluminum, the sum of the bright portion signal intensity average value and dark portion signal intensity average value of a coin whose damage level is low is small and the sum of the bright portion signal intensity average value and dark portion signal intensity average value becomes larger as the damage level of a coin increases. Therefore, it is possible to discriminate whether or not a coin is damaged to higher than a predetermined level by comparing the sum of the bright portion signal intensity average value and dark portion signal intensity average value with a threshold value defined for each denomination of coins, and since the method for discriminating coins according to this preferred aspect of the present invention includes the steps of discriminating whether or not a coin is damaged to higher than a predetermined level based on the difference between the bright portion signal intensity average value and dark portion signal intensity average value and further discriminating whether or not a coin is damaged to higher than a predetermined level by calculating the sum of the bright portion signal intensity average value and dark portion signal intensity average value and estimating the sum of the bright portion signal intensity average value and dark portion signal intensity average value in accordance with an algorithm for the corresponding denomination, it Is possible to discriminate whether or not a coin is damaged to higher than a predetermined level with high accuracy.

In a further preferred aspect of the present invention, the method for discriminating coins further comprises steps of comparing the detected pattern data and the reference pattern data by pattern matching to detect a degree to which the detected pattern data and the reference pattern data coincide with each other, comparing the degree to which the detected pattern data and the reference pattern data coincide with each other with a threshold value of coins of a corresponding denomination among threshold values defined for each denomination of coins, and discriminating that a damage level of the surface of the coin is equal to or lower than a predetermined level when the degree to which the detected pattern data and the reference pattern data coincide with each other is equal to or larger than the threshold value and that the surface of the coin is damaged to higher than the predetermined level when the degree to which the detected pattern data and the reference pattern data coincide with each other is smaller than the threshold value.

According to this preferred aspect of the present invention, it is possible to discriminate whether or not a coin is damaged to higher than a predetermined level with high accuracy because the method for discriminating coins includes the steps of discriminating whether or not a coin is damaged to higher than a predetermined level based on the difference between the bright portion signal intensity average value and dark portion signal intensity average value, comparing the detected pattern data and the reference pattern data by pattern matching to detect a degree to which the detected pattern data and the reference pattern data coincide with each other, comparing the degree to which the detected pattern data and the reference pattern data coincide with each other with a threshold value of coins of a corresponding denomination among threshold values defined for each denomination of coins, and discriminating that a damage level of the surface of the coin is equal to or lower than a predetermined level when the degree to which the detected pattern data and the reference pattern data coincide with each other is equal to or larger than the threshold value and that the surface of the coin is damaged to higher than the predetermined level when the degree to which the detected pattern data and the reference pattern data coincide with each other is smaller than the threshold value.

In a further preferred aspect of the present invention, in the case where a coin is made of a cupronickel system material, a brass system material or a bronze system material, the method for discriminating coins further comprises steps of comparing the sum of the bright portion signal intensity average value and dark portion signal intensity average value with a threshold value of coins of a corresponding denomination among threshold values defined for each denomination of coins and discriminating that a damage level of the surface of the coin is equal to or lower than a predetermined level when the sum of the bright portion signal intensity average value and dark portion signal intensity average value is equal to or larger than the threshold value and that the surface of the coin is damaged to higher than the predetermined level when the sum of the bright portion signal intensity average value and dark portion signal intensity average value is smaller than the threshold value, and in the case where a coin is made of an aluminum system material, the method for discriminating coins further comprises steps of comparing the sum of the bright portion signal intensity average value and dark portion signal intensity average value with a threshold value of coins of a corresponding denomination among threshold values defined for each denomination of coins and discriminating that the surface of the coin is damaged to higher than the predetermined level when the sum of the bright portion signal intensity average value and dark portion signal intensity average value is equal to or larger than the threshold value and that a damage level of the surface of the coin is equal to or lower than a predetermined level when the sum of the bright portion signal intensity average value and dark portion signal intensity average value is smaller than the threshold value.

In a further preferred aspect of the present invention, the detected pattern data and the reference pattern data are mapped in an r-θ coordinate system.

The above and other objects of the present invention can be also accomplished by a coin discriminating apparatus comprising a coin passage member for supporting a lower surface of a coin, a first transporting belt disposed above the coin passage member adapted for forming a coin passage between the coin passage member and itself and holding the coin between the coin passage member and itself, thereby transporting it, a first light source for emitting light via a first transparent passage portion formed in the coin passage member toward the lower surface of the coin being transported by the first transporting belt on the coin passage member, a first light receiving means for photoelectrically detecting light emitted from the first light source and reflected from the lower surface of the coin via the first transparent portion and producing detected pattern data of the lower surface of the coin, a second transporting belt for supporting the lower surface of the coin, a coin passage forming member disposed above the second transporting belt for forming the coin passage between the lower surface thereof and the second transporting belt and holding the coin between the lower surface thereof and the second transporting belt, thereby transporting it, a second light source for emitting light via a second transparent passage portion formed in the coin passage forming member toward an upper surface of the coin being supported and transported by the second transporting belt, a second light receiving means for photoelectrically detecting light emitted from the second light source and reflected from the upper surface of the coin via the second transparent portion and producing detected pattern data of the upper surface of the coin, a first pattern data storing means for storing the detected pattern data of the lower surface of the coin produced by the first light receiving means, a second pattern data storing means for storing the detected pattern data of the upper surface of the coin produced by the second light receiving means, a reference pattern data storing means for storing reference pattern data of coins of each denomination, a reference damage level data storing means for storing reference damage level data of coins of each denomination, a denomination discriminating means for comparing the detected pattern data of the lower surface of the coin stored in the first pattern-data storing means and the reference pattern data of coins of each denomination stored in the reference pattern data storing means by pattern matching and comparing the detected pattern data of the upper surface of the coin stored in the second pattern data storing means and the reference pattern data of coins of each denomination stored in the reference pattern data storing means by pattern matching, thereby discriminating whether or not the coin is acceptable and the denomination of the coin, and a damage level discriminating means for discriminating whether or not the coin is damaged to higher than a predetermined level based on the detected pattern data of the lower surface of the coin stored in the first pattern data storing means and the detected pattern data of the upper surface of the coin stored in the second pattern data storing means, the damage level discriminating means being constituted so as to binarize the reference pattern data of the obverse surface and the reverse surface of the coin of the denomination discriminated by the denomination discriminating means so that “1” is assigned to pixel data having a signal intensity level equal to ox higher than a predetermined signal intensity level and “0” is assigned to pixel data having a signal intensity level lower than the predetermined signal intensity level to produce reference bright portion pattern data consisting of “1” pixel data and reference dark portion pattern data consisting of “0” pixel data, extract, based on the thus produced reference bright portion pattern data and reference dark portion pattern data, bright portion pattern data consisting of pixels corresponding to pixels included in the reference bright portion pattern data of the lower surface of the coin from the detected pattern data of the lower surface of the coin and dark portion pattern data consisting of pixels corresponding to pixels included in the reference dark portion pattern data of the lower surface of the coin from the detected pattern data of the lower surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the lower surface of a coin of the denomination discriminated by the denomination discriminating means among threshold values of the obverse surfaces and the reverse surfaces of coins of each denomination stored in the reference damage level data storing means, discriminate that a damage level of the lower surface of the coin is equal to or lower than a predetermined level when the difference between the bright portion data signal intensity average value and dark portion data signal intensity average value is equal to or larger than the threshold value and that the lower surface of the coin is damaged to higher than the predetermined level when the difference between the bright portion data signal intensity average value and dark portion data signal intensity average value is smaller than the threshold value, extract bright portion pattern data consisting of pixels corresponding to pixels included in the reference bright portion pattern data of the upper surface of the coin from the detected pattern data of the upper surface of the coin and dark portion pattern data consisting of pixels corresponding to pixels included in the reference dark portion pattern data of the upper surface of the coin from the detected pattern data of the upper surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the upper surface of a coin of the denomination discriminated by the denomination discriminating means among threshold values of the obverse surfaces and the reverse surfaces of coins of each denomination stored in the reference damage level data storing means, and discriminate that a damage level of the upper surface of the coin is equal to or lower than a predetermined level when the difference between the bright portion data signal intensity average value and dark portion data signal intensity average value is equal to or larger than the threshold value and that the upper surface of the coin is damaged to higher than the predetermined level when the difference between the bright portion data signal intensity average value and dark portion data signal intensity average value is smaller than the threshold value.

In a study done by the inventors of the present invention, it was confirmed that the intensity of light reflected from an edge portion of a coin is generally high but when the coin has been in circulation for a long time and damaged, the resulting wear of the edge portion of the coin causes the bright portion data signal intensity average value obtained from the damaged coin to be lower than that obtained from an undamaged coin and that, on the other hand, the intensity of light reflected from a flat portion of a coin is generally low but when the coin has been in circulation for a long time and damaged, the resulting irregular light reflection owing to scratching and/or staining of the flat portion of the coin causes the dark portion data signal intensity average value obtained from the damaged coin to be higher than that obtained from an undamaged coin. Therefore, since the bright portion data signal intensity average value becomes lower as the damage level of a coin increases and, on the other hand, the dark portion data signal intensity average value becomes higher as the damage level of a coin increases, it is possible to discriminate, based on the bright portion data signal intensity average value and the dark portion data signal intensity average value, whether or not the coin is damaged to higher than a predetermined level with extremely high accuracy, and according to the present invention, the damage level discriminating means is constituted so as to binarize the reference pattern data of the obverse surface and the reverse surface of the coin of the denomination discriminated by the denomination discriminating means so that “1” is assigned to pixel data having a signal intensity level equal to or higher than a predetermined signal intensity level and “0” is assigned to pixel data having a signal intensity level lower than the predetermined signal intensity level to produce reference bright portion pattern data consisting of “1” pixel data and reference dark portion pattern data consisting of “0” pixel data, extract, based on the thus produced reference bright portion pattern data and reference dark portion pattern data, bright portion pattern data consisting of pixels corresponding to pixels included in the reference bright portion pattern data of the lower surface of the coin from the detected pattern data of the lower surface of the coin and dark portion pattern data consisting of pixels corresponding to pixels included in the reference dark portion pattern data of the lower surface of the coin from the detected pattern data of the lower surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the lower surface of a coin of the denomination discriminated by the denomination discriminating means among threshold values of the obverse surfaces and the reverse surfaces of coins of each denomination stored in the reference damage level data storing means, discriminate that a damage level of the lower surface of the coin is equal to or lower than a predetermined level when the difference between the bright portion data signal intensity average value and dark portion data signal intensity average value is equal to or larger than the threshold value and that the lower surface of the coin is damaged to higher than the predetermined level when the difference between the bright portion data signal intensity average value and dark portion data signal intensity average value is smaller than the threshold value, extract bright portion pattern data consisting of pixels corresponding to pixels included in the reference bright portion pattern data of the upper surface of the coin from the detected pattern data of the upper surface of the coin and dark portion pattern data consisting of pixels corresponding to pixels included in the reference dark portion pattern data of the upper surface of the coin from the detected pattern data of the upper surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the upper surface of a coin of the denomination discriminated by the denomination discriminating means among threshold values of the obverse surfaces and the reverse surfaces of coins of each denomination stored in the reference damage level data storing means, and discriminate that a damage level of the upper surface of the coin is equal to or lower than a predetermined level when the difference between the bright portion data signal intensity average value and dark portion data signal intensity average value is equal to or larger than the threshold value and-that the upper surface of the coin is damaged to higher than the predetermined level when the difference between the bright portion data signal intensity average value and dark portion data signal intensity average value is smaller than the threshold value, it is possible to discriminate whether or not the coin is damaged to higher than the predetermined level with extremely high accuracy.

Further, according to the present invention, since it is possible to discriminate whether or not the coin is damaged to higher than a predetermined level only by providing the first light source, the first light receiving means, the second light source and the second light receiving means, it is possible to discriminate whether or not a coin is acceptable, the denomination of the coin and whether or not the surface of the coin is damaged to higher than a predetermined level.

In a preferred aspect of the present invention, the reference pattern data storing means is constituted so as to store the reference bright portion pattern data and the reference dark portion pattern data.

According to this preferred aspect of the present invention, since the reference bright portion pattern data and the reference dark portion pattern data are produced in advance and stored in the reference pattern data storing means, it is possible to shorten time required for calculation and efficiently discriminate whether or not the surface of the coin is damaged to higher than a predetermined level.

In another preferred aspect of the present invention, the damage level discriminating means is constituted so as to produce the reference bright portion pattern data and reference dark portion pattern data of the lower surface of a coin of the denomination discriminated by the denomination discriminating means and the reference bright portion pattern data and reference dark portion pattern data of the upper surface of a coin of the denomination discriminated by the denomination discriminating means and store the produced data in the reference pattern data storing means.

In a further preferred aspect of the present invention, the damage level discriminating means is constituted so as to calculate the sum of the bright portion signal intensity average value and dark portion signal intensity average value and estimate the sum of the bright portion signal intensity average value and dark portion signal intensity average value in accordance with an algorithm for the corresponding denomination, thereby discriminating whether or not the surface of the coin is damaged to higher than a predetermined level and the reference damage level data storing means is constituted so as to store the algorithm for each denomination of coins.

In a study done by the inventors of the present invention, it was found that in the case where a coin is made of a cupronickel system material, a brass system material or a bronze system material, the sum of the bright portion signal intensity average value and dark portion signal intensity average value of a coin whose damage level is low is large and the sum of the bright portion signal intensity average value and dark portion signal intensity average value becomes smaller as the damage level of a coin increases and, on the other hand, that in the case where a coin is made of aluminum, the sum of the bright portion signal intensity average value and dark portion signal intensity average value of a coin whose damage level is low is small and the sum of the bright portion signal intensity average value and dark portion signal intensity average value becomes larger as the damage level of a coin increases. Therefore, it is possible to discriminate whether or not a coin is damaged to higher than a predetermined level by comparing the sum of the bright portion signal intensity average value and dark portion signal intensity average value with a threshold value defined for each denomination of coins, and according to this preferred aspect of the present invention, since the damage level discriminating means is constituted so as to discriminate whether or not a coin is damaged to higher than a predetermined level based on the difference between the bright portion signal intensity average value and dark portion signal intensity average value and further discriminate whether or not a coin is damaged to higher than a predetermined level by calculating the sum of the bright portion signal intensity average value and dark portion signal intensity average value and estimating the sum of the bright portion signal intensity average value and dark portion signal intensity average value in accordance with an algorithm for the corresponding denomination, it is possible to discriminate whether or not a coin is damaged to higher than a predetermined level with high accuracy.

In a further preferred aspect of the present invention, the damage level discriminating means is further constituted so as to compare a degree of pattern matching determined by the denomination discriminating means regarding level of coincidence between the detected pattern data of the lower surface of the coin and the reference pattern data of coins of each denomination stored in the reference pattern data storing means with a threshold value of the lower surface of a coin of the denomination discriminated by the denomination discriminating means among threshold values defined for obverse and reverse surfaces of coins of each denomination, discriminate that a damage level of the lower surface of the coin is equal to or lower than a predetermined level when the degree of the pattern matching is equal to or larger than the threshold value and that the lower surface of the coin is damaged to higher than the predetermined level when the degree of the pattern matching is smaller than the threshold value, compare the degree of pattern matching determined by the denomination discriminating means regarding level of coincidence between the detected pattern data of the upper surface of the coin and the reference pattern data of coins of each denomination stored in the reference pattern data storing means with a threshold value of the upper surface of a coin of the denomination discriminated by the denomination discriminating means among threshold values defined for obverse and reverse surfaces of coins of each denomination, and discriminate that a damage level of the upper surface of the coin is equal to or lower than a predetermined level when the degree of the pattern matching is equal to or larger than the threshold value and that the upper surface of the coin is damaged to higher than the predetermined level when the degree of the pattern matching is smaller than the threshold value.

According to this preferred aspect of the present invention, it is possible to discriminate whether or not a coin is damaged to higher than a predetermined level with high accuracy because the damage level discriminating means is constituted so as to discriminate whether or not the coin is damaged to higher than a predetermined level based on the difference between the bright portion signal intensity average value and dark portion signal intensity average value and is further constituted so as to compare the degree of the pattern matching determined by the denomination discriminating means regarding level of coincidence between the detected pattern data of the lower surface of the coin and the reference pattern data of coins of each denomination stored in the reference pattern data storing means with a threshold value of the lower surface of a coin of the denomination discriminated by the denomination discriminating means among threshold values defined for obverse and reverse surfaces of coins of each denomination, discriminate that a damage level of the lower surface of the coin is equal to or lower than a predetermined level when the degree of the pattern matching is equal to or larger than the threshold value and that the lower surface of the coin is damaged to higher than the predetermined level when the degree of the pattern matching is smaller than the threshold value, compare the degree of the pattern matching determined by the denomination discriminating means regarding level of coincidence between the detected pattern data of the upper surface of the coin and the reference pattern data of coins of each denomination stored in the reference pattern data storing means with a threshold value of the upper surface of a coin of the denomination discriminated by the denomination discriminating means among threshold values defined for obverse and reverse surfaces of coins of each denomination, and discriminate that a damage level of the upper surface of the coin is equal to or lower than a predetermined level when the degree of the pattern matching is equal to or larger than the threshold value and that the upper surface of the coin is damaged to higher than the predetermined level when the degree of the pattern matching is smaller than the threshold value.

In a further preferred aspect of the present invention, the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

In a further preferred aspect of the present invention, the denomination discriminating means is constituted so as to compare the reference pattern data mapped in an r-θ coordinate system and the detected pattern data mapped in the r-θ coordinate system by pattern matching, thereby discriminating whether or not the coin is acceptable and the denomination of the coin.

In a further preferred aspect of the present invention, the coin discriminating apparatus further comprises a data processing means for effecting edge enhancement processing on the detected pattern data and the denomination discriminating means is constituted so as to compare the reference pattern data and the detected pattern data subjected to edge enhancement processing by pattern matching, thereby discriminating whether or not the coin is acceptable and the denomination of the coin.

According to this preferred aspect of the present invention, since the coin discriminating apparatus further includes a data processing means for effecting edge enhancement processing on the detected pattern data and the denomination discriminating means is constituted so as to compare the reference pattern data and the detected pattern data subjected to edge enhancement processing by pattern matching, thereby discriminating whether or not the coin is acceptable and the denomination of the coin, it is possible to markedly improve the accuracy of pattern matching between the reference pattern data and the detected pattern data and it is therefore possible to discriminate whether or not the coin is acceptable and the denomination of the coin with higher accuracy and discriminate whether or not the coin is damaged to higher than a predetermined level with higher accuracy.

The above and other objects and features of the present invention will become apparent from the following description made with reference to the accompanying drawings.

DESCRIPTION OF THE PREFERRED EMBODIMENTS

Figure 1:
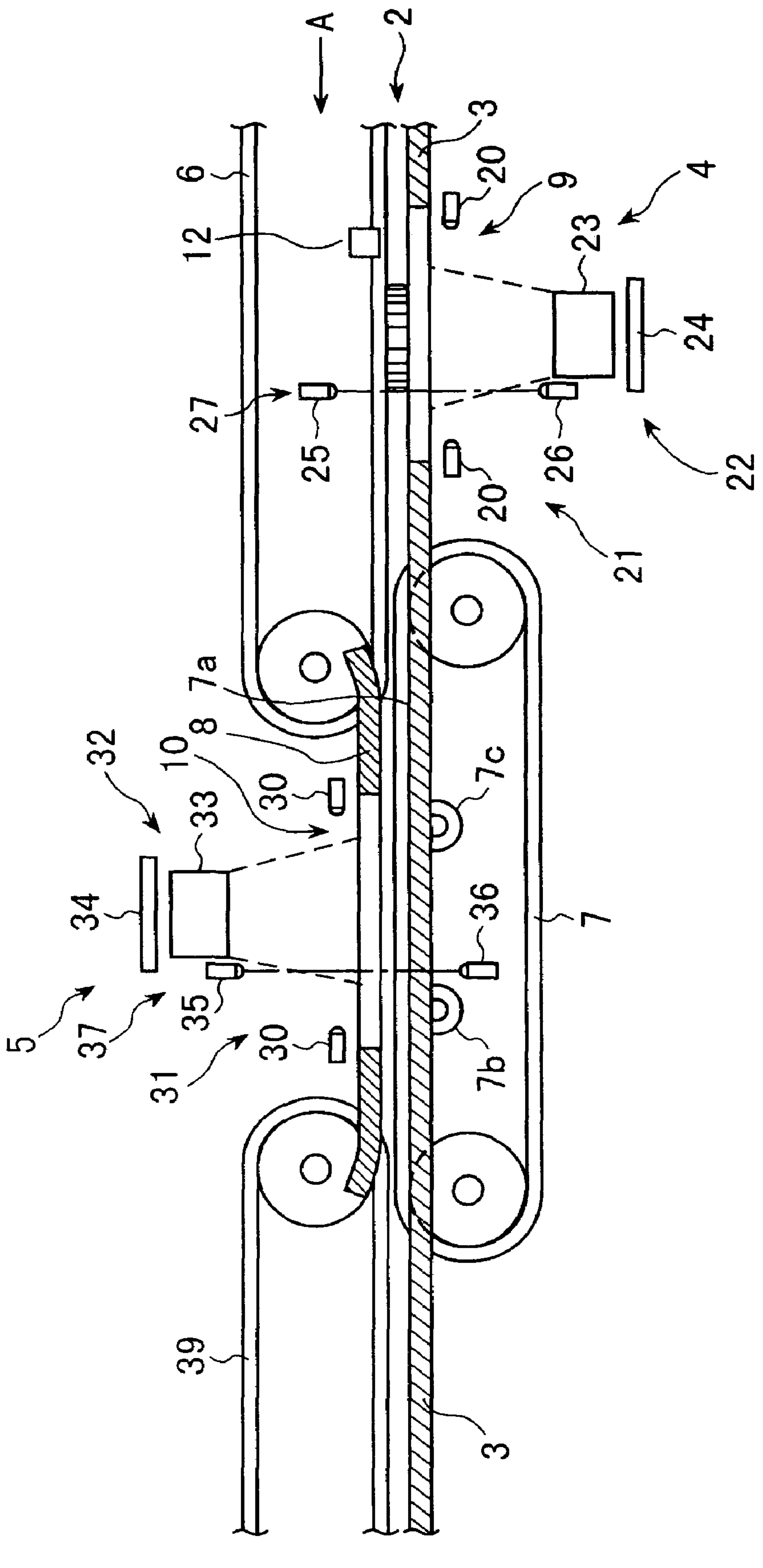
FIG. 1 is a schematic longitudinal cross-sectional view of a coin discriminating apparatus which is a preferred embodiment of the present invention.

FIG. 1 is a schematic longitudinal cross-sectional view of a coin discriminating apparatus which is a preferred embodiment of the present invention.

As shown in FIG. 1, a coin passage 2 through which coins 1 are transported is provided with a coin passage member 3 extending in the transporting direction of the coins 1 over the entire distance that the coins 1 are transported. The coin discriminating apparatus includes a first pattern data detection unit 4 and a second pattern data detection unit 5. In the vicinity of the first pattern data detection unit 4, the coin passage 2 is formed by the coin passage member 3 located below and a transporting belt 6 constituted as an endless round belt. In the vicinity of the second pattern data detection unit 5, the coin passage 2 is formed by a transporting belt 7 constituted as an endless belt located to project upward from an opening 7*a* formed in the coin passage member 3 and a coin passage forming member 8 located above the transporting belt 7 and extending in the transporting direction of coins 1.

As shown in FIG. 1, the coin passage member 3 where the first pattern data detection unit 4 is provided is formed with a first transparent passage portion 9 made of transparent glass, acrylic resin or the like and the coin passage forming member 8 is formed with a second transparent passage portion 10 made of transparent glass, acrylic resin or the like.

Figure 2:
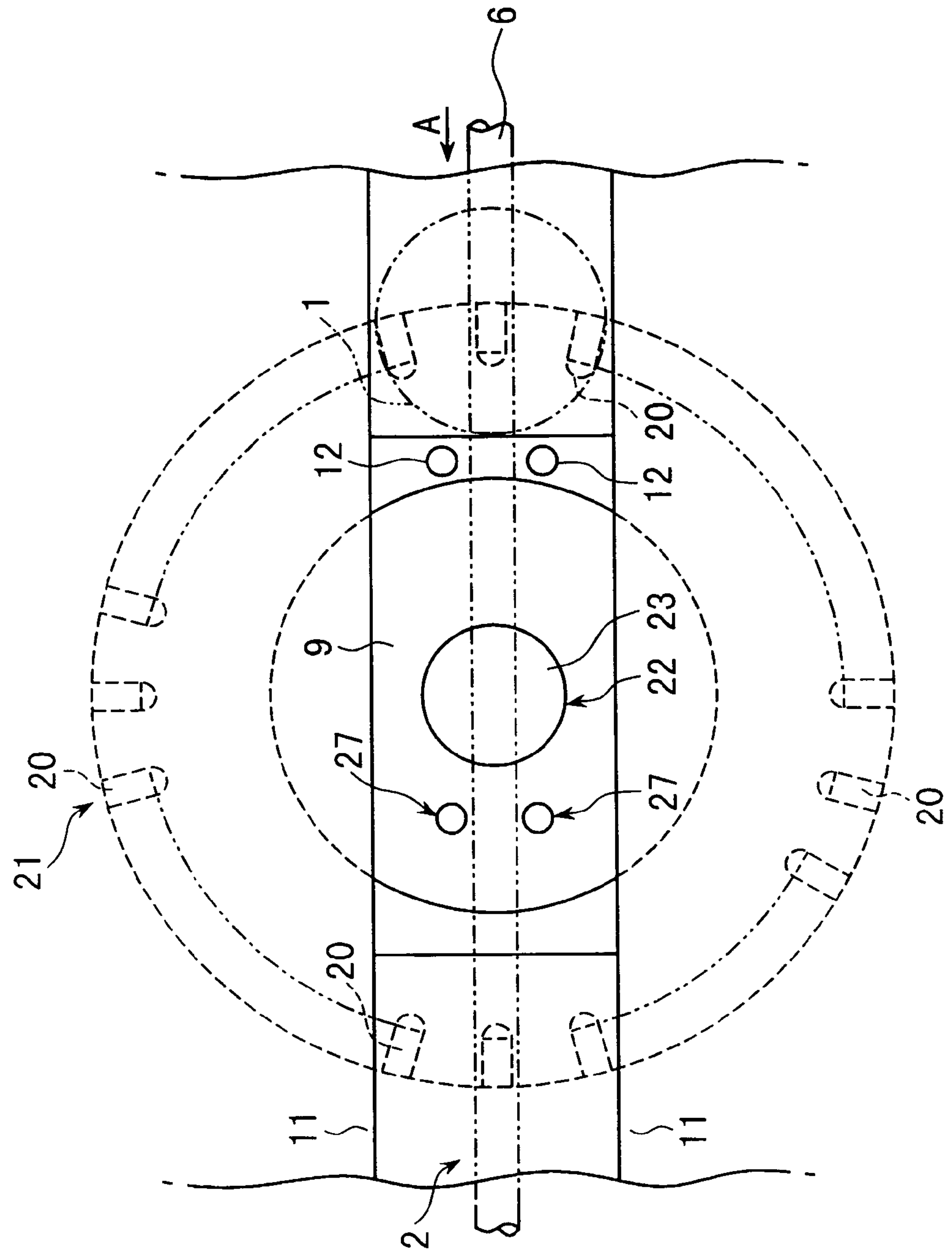
FIG. 2 is a schematic plan view of a first transparent passage portion.

FIG. 2 is a schematic plan view of the first transparent passage portion 9.

As shown in FIGS. 1 and 2, a coin 1 is fed to the first transparent passage portion 9 in the coin passage 2 along a pair of guide rails 11, 11 in the direction indicated by an arrow A by the transporting belt 6 located above the coin passage 2. A pair of magnetic sensors 12, 12 are provided for detecting magnetic properties of the coin 1 upstream of the first transparent passage portion 9 with respect to the coin transporting direction. The coin 1 is fed onto the first transparent passage portion 9, while being pressed onto the upper surface of the first transparent passage portion 9 by the transporting belt 6. Below the first transparent passage portion 9, there are provided a first light emitting means 21 including a plurality of light emitting elements 20 for emitting light toward the coin 1 passing through the first transparent passage portion 9 and a first image data producing means 22 below the first light emitting means 21 for receiving light emitted from the first light emitting means 21 and reflected by the coin 1 and producing image data. Thus, a first pattern data detection unit 4 is constituted by the first light emitting means 21 and the first image data producing means 22.

As shown in FIG. 2, the first light emitting means 21 is provided with the plurality of light emitting elements 20 such as light emitting diodes (LEDs) disposed on a circle whose center is at the center portion of the first transparent passage portion 9. Each light emitting element 20 is disposed in such a manner that the optical axis thereof is directed at a small angle with respect to the horizontal direction toward a predetermined point on a vertical axis passing through the center of a circle whose center coincides with the center portion of the first transparent passage portion 9, whereby light is projected onto the coin 1 passing through the first transparent passage portion 9 at a shallow angle with respect to the surface of the coin 1.

The first image data producing means 22 includes a lens system 23 disposed so that the optical axis thereof coincides with the vertical axis passing through the center of the circle whose center coincides with the center portion of the first transparent passage portion 9, a monochrome type sensor 24 disposed below the lens system 23 so that the focus point thereof is located on the upper surface of the first transparent passage portion 9 and adapted for photoelectrically detecting light emitted from the light emitting elements 20 and reflected by the surface of the coin 1, and an A/D converter (not shown) for converting image data of the lower surface of the coin 1 obtained by photoelectrically detecting by the sensor 24 into digital signals, thereby producing digitized image data of the lower surface of the coin 1. In this embodiment, a two-dimensional CCD sensor is used as the sensor 24.

On the immediately downstream side of the first image data producing means 22, two timing sensors 27, 27 each of which includes a light emitting element 25 and a light receiving element 26 are provided so that light emitted from the light emitting element 25 can be detected through the first transparent passage portion 9 by the light receiving element 26 and each is constituted so as to output a timing signal when the light receiving element 26 does not receive light emitted from the light emitting element 25. Each of the timing sensors 27, 27 is disposed with respect to the first image data producing means 22 so that the center of the coin 1 is located at the center of the first transparent passage portion 9 when light emitted from the light emitting element 25 is blocked by the coin 1 being transported on the surface of the first transparent passage portion 9 and is not received by the light receiving element 26, thereby outputting a timing signal.

As shown in FIG. 1, the coin 1 is pressed onto the upper surface of the coin passage member 3 by the transporting belt 6 provided above the coin passage and is transported in the first transparent passage portion 9 and the portion downstream thereof At the downstream portion of the first transparent passage portion 9, the lower surface of the coin l is supported by the transporting belt 7 located to project above the coin passage member 3 from the opening 7*a* formed in the coin passage member 3 and is transported in the coin passage 2 while it is being held between the transporting belt 6 and the transporting belt 7.

As shown in FIG. 1, the coin 1 is transported in the region of the downstream portion of the first transparent passage portion 9 and is fed to the second pattern data detection unit 5, while the upper surface of the coin 1 is supported by the coin passage forming member 8 and pressed onto the lower surface of the coin passage forming member 8 by the transporting belt 7. A plurality of back-up rollers 7*b,* 7*c* are provided for preventing the transporting belt 7 from-being deflected downwardly due to the dead load of the coin 1.

The second pattern data detection unit 5 is provided above the second transparent passage portion 10 and includes a second light emitting means 31 including a plurality of light emitting elements 30 for emitting light toward the coin 1 passing through the second transparent passage portion 10 and a second image data producing means 32 provided above the second transparent passage portion 10 for receiving light emitted from the second light emitting means 31 and reflected by the coin 1 and producing image data. The second light emitting means 31 is constituted in a similar manner to the first light emitting means 21 except that it is disposed above the second transparent passage portion 10 and emits light downwardly and includes a plurality of light emitting elements 30 such as light emitting diodes (LEDs) arranged on the circle whose center coincides with the center portion of the second transparent passage portion 10. Each light emitting element 30 is disposed in such a manner that the optical axis thereof is directed at a small angle with respect to the horizontal direction toward a predetermined point on a vertical axis passing through the center of the circle whose center coincides with the center portion of the second transparent passage portion 10, whereby light is projected onto the coin 1 passing through the second transparent passage portion 10 at a shallow angle with respect to the surface of the coin 1.

The second image data producing means 32 includes a lens system 33 disposed so that the optical axis thereof coincides with the vertical axis passing through the center of the circle whose center coincides with the center portion of the second transparent passage portion 10, a monochrome type sensor 34 disposed above the lens system 33 so that the focus point thereof is located on the lower surface of the second transparent passage portion 10 and adapted for photoelectrically detecting light emitted from the light emitting elements 30 and reflected by the surface of the coin 1, and an A/D converter (not shown) for converting image data of the upper surface of the coin 1 obtained by photoelectrically detecting by the sensor 34 into digital signals, thereby producing digitized image data of the upper surface of the coin 1. In this embodiment, a two-dimensional CCD sensor is used as the sensor 34.

On the immediately downstream side of the second image data producing means 32, two timing sensors 37, 37 each of which includes a light emitting element 35 and a light receiving element 36 are provided so that light emitted from the light emitting element 35 can be detected through the second transparent passage portion 10 by the light receiving element 36 and each is constituted so as to output a timing signal when the light receiving element 36 does not receive light emitted from the light emitting element 35. Each of the timing sensors 37 is disposed with respect to the second image data producing means 32 so that the center of the coin 1 is located at the center of the second transparent passage portion 10 when light emitted from the light emitting element 35 is blocked by the coin 1 being transported on the surface of the second transparent passage portion 10 and is not received by the light receiving element 36, thereby outputting a timing signal.

As shown in FIG. 1, a transporting belt 39 is provided so as to extend from the immediately upstream portion of the downstream end portion of the coin passage forming member 8 toward the downstream portion of the coin passage 2 and after the coin passes through the second transparent passage portion 10, the coin is held between the transporting belt 7 and the transporting belt 39 and further held between the transporting belt 39 and the coin passage member 3, thereby being transported toward the downstream portion in the coin passage 2.

Figure 3:
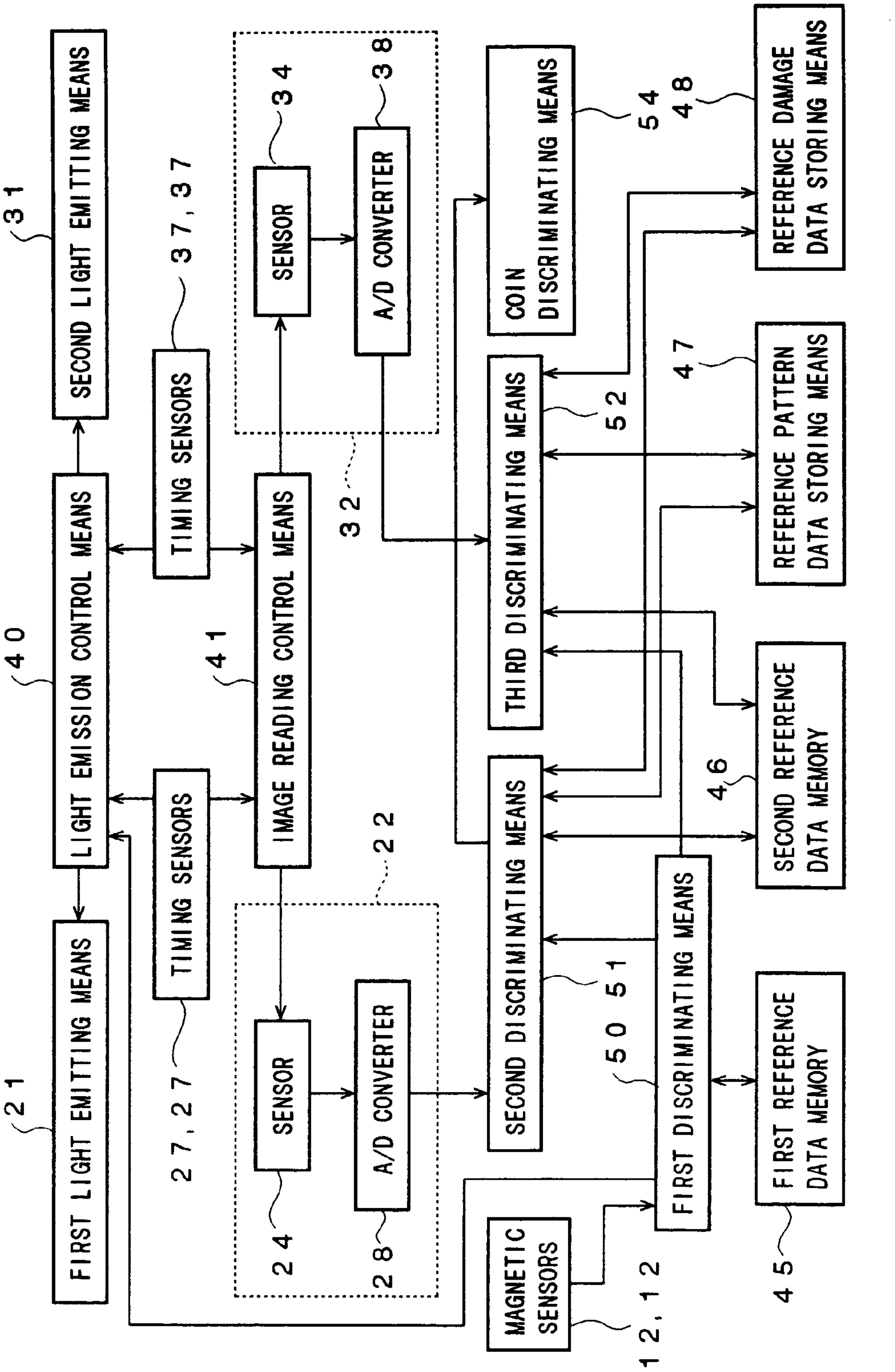
FIG. 3 is a block diagram of detection, control and discrimination systems of a coin discriminating apparatus which is a preferred embodiment of the present invention.

FIG. 3 is a block diagram of detection, control and discrimination systems of the coin discriminating apparatus which is a preferred embodiment of the present invention.

As shown in FIG. 3, the detection system of the coin discriminating apparatus includes the two timing sensors 27, 27 for detecting a coin 1 fed to the first transparent passage portion 9 and the two timing sensors 37, 37 for detecting a coin fed to the second transparent passage portion 10.

As shown in FIG. 3, the control system of the coin discriminating apparatus includes light emission control means 40 which outputs a light emission signal to the first light emitting means 21 when the timing signal from the timing sensors 27, 27 is received and causes it to emit light and illuminate the coin 1 located on the upper surface of the first transparent passage portion 9 and outputs a light emission signal to the second light emitting means 31 when the timing signal from the timing sensors 37, 37 is received and causes it to emit light and illuminate the coin 1 located on the lower surface of the second transparent passage portion 10, and image reading control means 41 for permitting the sensor 24 of the first image data producing means 22 to start detecting the light reflected from the surface of the coin 1 when the timing signal from the timing sensors 27, 27 is received and permitting the sensor 34 of the second image data producing means 32 to start detecting the light reflected from the surface of the coin 1 when the timing signal from the timing sensors 37, 37 is received.

As shown in FIG. 3, the discriminating system of the coin discriminating apparatus includes a first reference data memory 45 for storing reference magnetic data indicating magnetic properties of coins 1 of each denomination; a second reference data memory 46 for storing reference diameter data relating to the diameter of coins 1 of each denomination; a reference pattern data storing means 47 for storing reference pattern data of both surfaces of coins 1 of each denomination; a reference damage data storing means 48 for storing reference damage level data of coins 1 of each denomination; a first discriminating means 50 which accesses the first reference data memory 45 in accordance with detection signals from the magnetic sensors 12, 12 and compares the reference magnetic data which indicate the magnetic properties of each denomination stored in the first reference data memory 45 with the magnetic data of the coin 1 input from the magnetic sensors 12, 12, thereby determining the denomination of the coin 1 and outputting a first discrimination signal; a second discriminating means 51 for discriminating, based on the first discrimination signal output from the first discriminating means 50, reference diameter data relating to the diameter of coins 1 of each denomination and stored in the second reference data memory 46 and image pattern data of the lower surface of a coin 1 photoelectrically detected by the sensor 24 and digitized by the AID converter 28, whether or not the coin 1 is acceptable and the denomination of the coin 1 and discriminating whether or not the lower surface of the coin 1 is damaged to higher than a predetermined level based on reference damage level data of coins 1 of each denomination stored in the reference damage data storing means 48; a third discriminating means 52 for discriminating, based on the first discrimination signal output from the first discriminating means 50, reference diameter data relating to the diameter of coins 1 of each denomination and stored in the second reference data memory 46 and image pattern data of the upper surface of a coin 1 photoelectrically detected by the sensor 34 and digitized by the A/D converter 38, whether or not the coin 1 is acceptable and the denomination of the coin 1 and discriminating whether or not the upper surface of the coin 1 is damaged to higher than a predetermined level based on reference damage level data of coins 1 of each denomination stored in the reference damage data storing means 48; and a coin discriminating means 54 for finally discriminating, based on the results of discrimination made by the second discriminating means 51 and the third discriminating means 52, whether or not the coin 1 is acceptable and the denomination of the coin 1.

In this embodiment, a first discrimination signal is output from the first discriminating means 50 to the light emission control means 40 and the light emission control means 40 is constituted so as to control the amount of light emitted from the light emitting elements 20 and the light emitting elements 30 in accordance with the first discrimination signal input from the first discriminating means 51 based on the denomination of the coin 1 discriminated by the first discriminating means 51.

Figure 4:
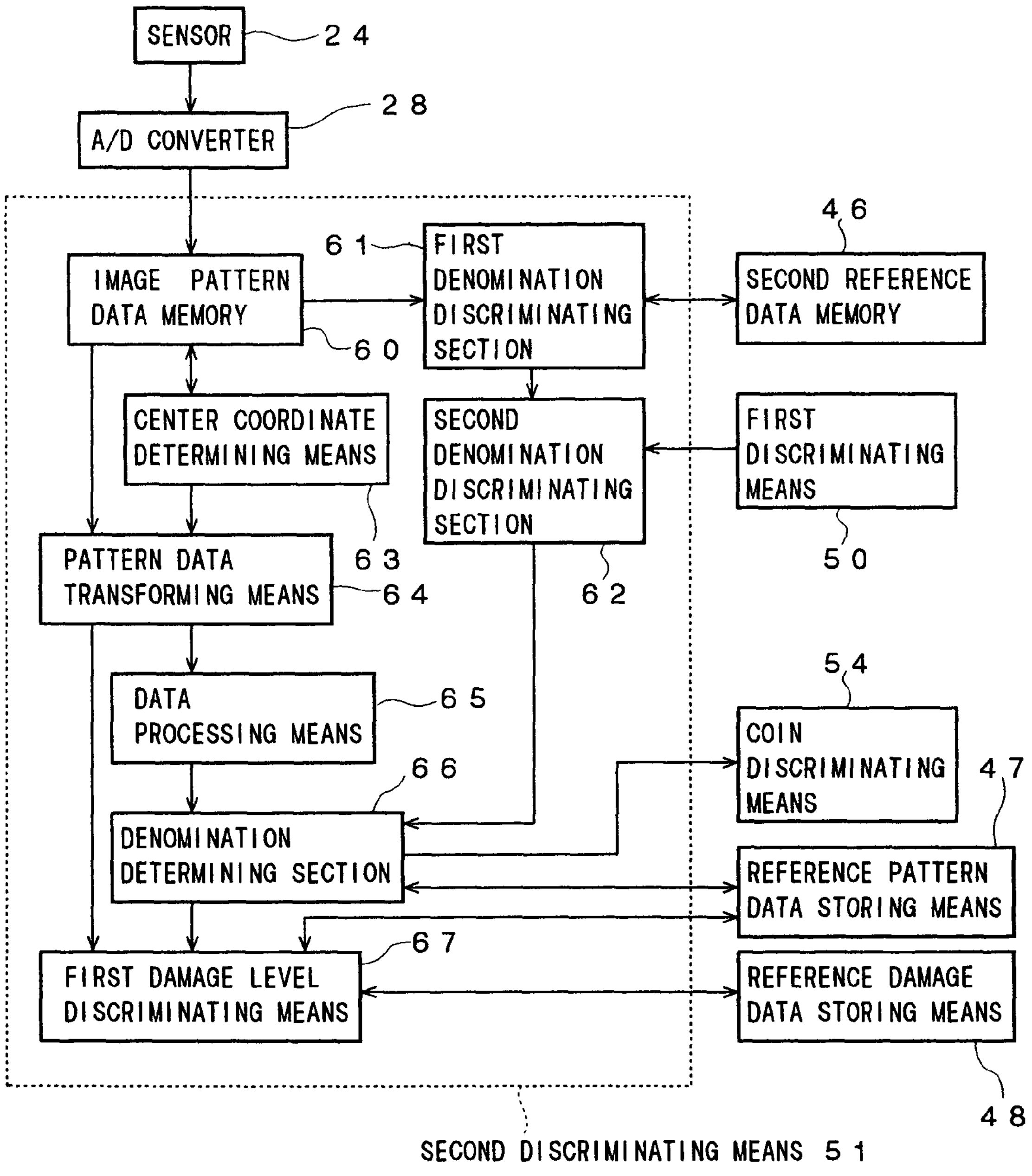
FIG. 4 is a block diagram of a second discriminating means.

FIG. 4 is a block diagram of the second discriminating means 51.

As shown in FIG. 4, the second discriminating means 51 includes an image pattern data memory 60 for mapping and storing the image pattern data of the lower surface of the coin 1 photoelectrically detected by the sensor 24 and digitized by the A/D converter 28 into an orthogonal coordinate system, i.e., an x-y coordinate system; a first denomination discriminating section 61 which accesses the second reference data memory 46 and compares the reference data relating to the diameter of the coin 1 of each denomination stored in the second reference data memory 46 with the image pattern data of the lower surface of the coin 1 read from the image pattern data memory 60, thereby determining the denomination of the coin 1 based on the diameter of the coin 1 and outputting a first denomination discrimination signal; a second denomination discriminating section 62 for discriminating the denomination of the coin 1 based on a first discrimination signal input from the first discriminating means 50 and a first denomination discrimination signal input from the first discriminating means 61 and outputting a second denomination discrimination signal; a center coordinate determining means 63 for obtaining the center coordinates of the image pattern data of the lower surface of the coin 1 mapped and stored in the image pattern data memory 60; a pattern data transforming means 64 for transforming pattern data of the lower surface of the coin 1 into the polar coordinate system, namely, the r-θ coordinate system, based on the center coordinate of the pattern data calculated by the center coordinate determining section 63, producing transformed pattern data and storing them; a data processing means 65 for effecting edge enhancement processing on transformed pattern data transformed into the r-θ coordinate system; a denomination determining section 66 for reading, based on a second denomination discrimination signal input from the second denomination discriminating section 62, reference pattern data of the obverse surface and the reverse surface of a coin 1 of a denomination discriminated by the second denomination discriminating section 62 from among reference pattern data of the obverse surface and the reverse surface of coins 1 of each denomination mapped in the r-θ coordinate system and stored in the reference pattern data storing means 47, comparing the thus read reference pattern data of the obverse surface and the reverse surface of the coin 1 with the transformed pattern data on which edge enhancement processing was effected by the data processing means 65, discriminating whether or not the coin 1 is acceptable and the denomination of the coin 1 in accordance with the degree to which the transformed pattern data coincides with the reference pattern data and outputting a denomination determination signal, pattern matching data indicating the degree to which the transformed pattern data coincides with the reference pattern data and a coin surface identification signal identifying which pattern data were used for determining the denomination of the coin 1 among pattern data of the obverse surface and the reverse surface of the coin 1; and a first damage level discriminating means 67 for discriminating whether or not the lower surface of the coin 1 is damaged to higher than a predetermined level.

Figure 5:
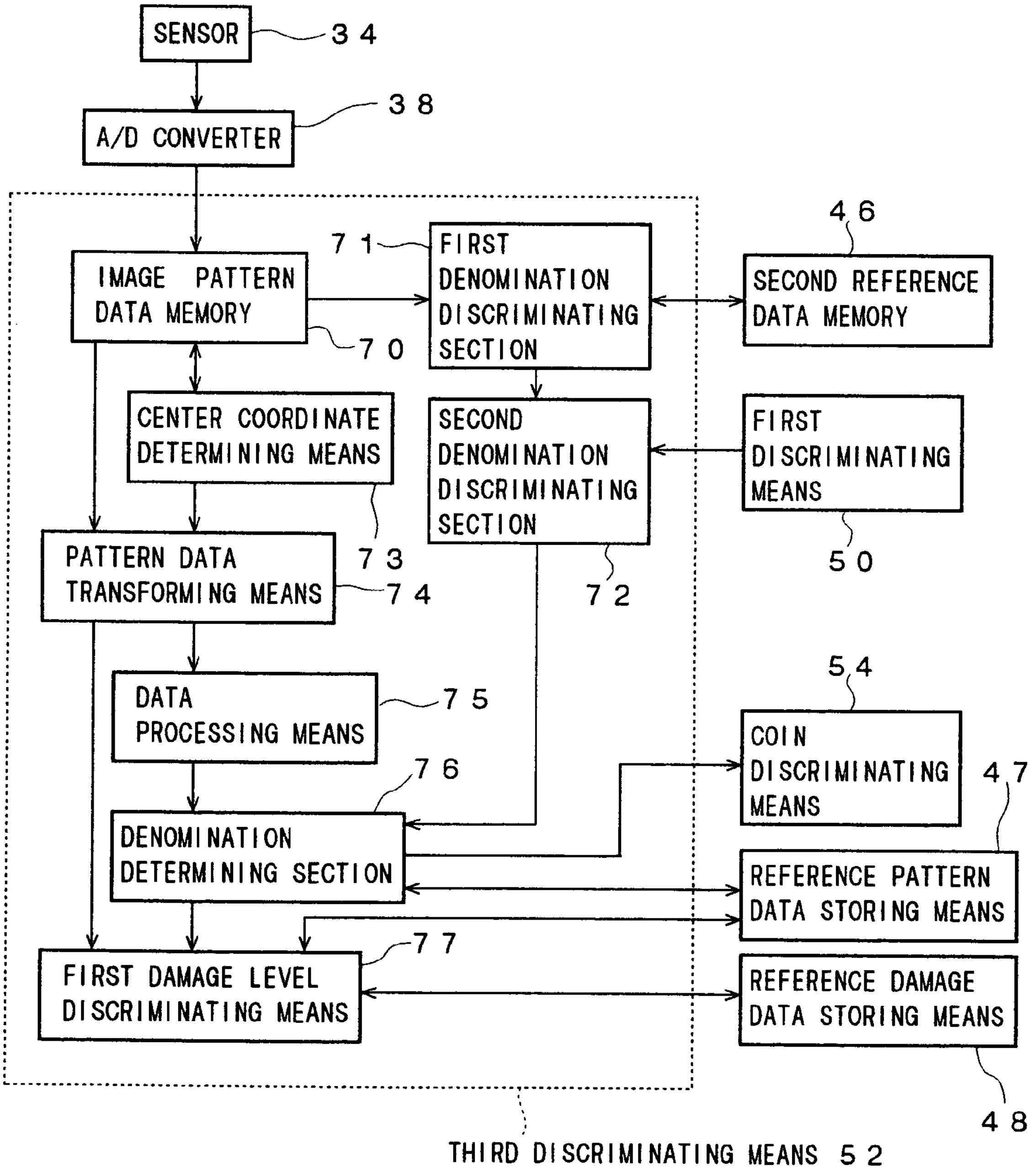
FIG. 5 is a block diagram of a third discriminating means.

FIG. 5 is a block diagram of the third discriminating means 52.

As shown in FIG. 5, the third discriminating means 52 includes an image pattern data memory 70 for mapping and storing the image pattern data of the upper surface of the coin 1 photoelectrically detected by the sensor 34 and digitized by the A/D converter 38 into an orthogonal coordinate system, i.e., an x-y coordinate system; a first denomination discriminating section 71 which accesses the second reference data memory 46 and compares the reference data relating to the diameter of the coin 1 of each denomination stored in the second reference data memory 46 with the image pattern data of the upper surface of the coin 1 read from the image pattern data memory 70, thereby determining the denomination of the coin 1 based on the diameter of the coin 1 and outputting a first denomination discrimination signal; a second denomination discriminating section 72 for discriminating the denomination of the coin 1 based on a first discrimination signal input from the first discriminating means 50 and a first denomination discrimination signal input from the first discriminating means 71 and outputting a second denomination discrimination signal; a center coordinate determining means 73 for obtaining the center coordinates of the image pattern data of the upper surface of the coin 1 mapped and stored in the image pattern data memory 70; a pattern data transforming means 74 for transforming pattern data of the upper surface of the coin 1 into the polar coordinate system, namely, the r-θ coordinate system, based on the center coordinate of the pattern data calculated by the center coordinate determining section 73, producing transformed pattern data and storing them; a data processing means 75 for effecting edge enhancement processing pattern data transformed into the r-θ coordinate system; a denomination determining section 76 for reading, based on a second denomination discrimination signal input from the second denomination discriminating section 72, reference pattern data of the obverse surface and the reverse surface of a coin 1 of a denomination discriminated by the second denomination discriminating section 72 from among reference pattern data of the obverse surface and the reverse surface of coins 1 of each denomination mapped in the r-θ coordinate system and stored in the reference pattern data storing means 47, comparing the thus read reference pattern data of the obverse surface and the reverse surface of the coin 1 with the transformed pattern data on which edge enhancement processing was effected by the data processing means 75, discriminating whether or not the coin 1 is acceptable and the denomination of the coin 1 in accordance with the degree to which the transformed pattern data coincides with the reference pattern data and outputting a denomination determination signal, pattern matching data indicating the degree to which the transformed pattern data coincides with the reference pattern data and a coin surface identification signal identifying which pattern data were used for determining the denomination of the coin 1 among pattern data of the obverse surface and the reverse surface of the coin 1; and a second damage level discriminating means 77 for discriminating whether or not the upper surface of the coin 1 is damaged to higher than a predetermined level.

Figure 6:
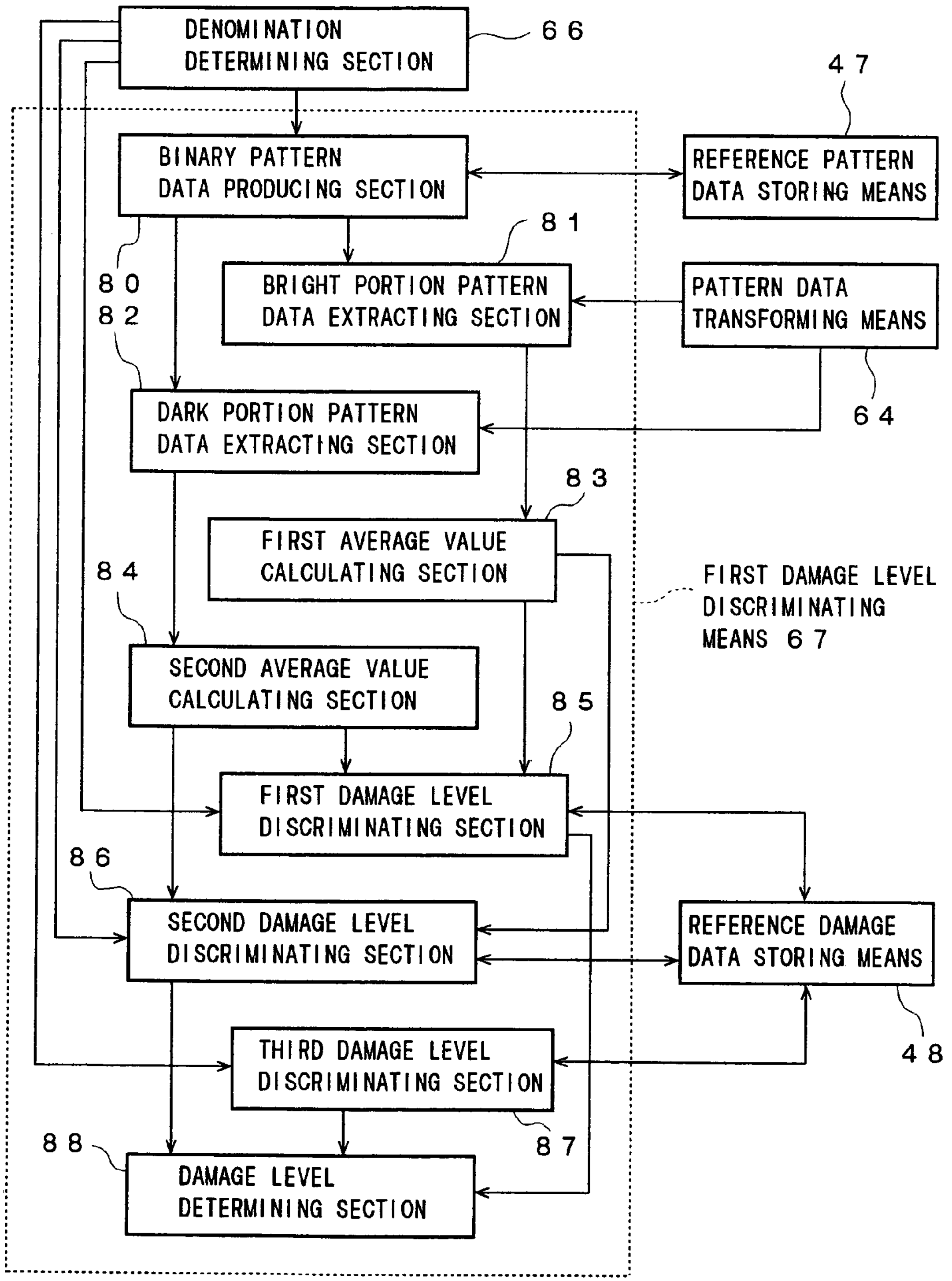
FIG. 6 is a block diagram of a first damage level determining means.

FIG. 6 is a block diagram of the first damage level determining means 67.

As shown in FIG. 6, the first damage level determining means 67 includes a binary pattern data producing section 80 for reading, based on a denomination determination signal input from the denomination determining section 66, reference pattern data of the obverse surface and the reverse surface of a coin 1 of a denomination discriminated by the denomination determining section 66 from among reference pattern data of the obverse surface and the reverse surface of coins 1 of each denomination mapped in the r-θ coordinate system and stored in the reference pattern data storing means 47, binarizing the reference pattern data so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data, outputting reference bright portion pattern data to a bright portion pattern data extracting section 81 and outputting reference dark portion pattern data to a dark portion pattern data extracting section 82; the bright portion pattern data extracting section 81 for extracting, based on reference bright portion pattern data input from the binary pattern data producing section 80, bright portion pattern data consisting of pixels corresponding to pixels included in reference bright portion pattern data from transformed pattern data mapped in the r-θ coordinate system and stored in the pattern data transforming means 64 of the second discriminating means 51; the dark portion pattern data extracting section 82 for extracting, based on reference dark portion pattern data input from the binary pattern data producing section 80, dark portion pattern data consisting of pixels corresponding to pixels included in reference dark portion pattern data from transformed pattern data mapped in the r-θ coordinate system and stored in the pattern data transforming means 64 of the second discriminating means 51; a first average value calculating section 83 for averaging signal intensity levels of pixels included in bright portion pattern data extracted by the bright portion pattern data extracting section 81 to calculate a bright portion data signal intensity average value; a second average value calculating section 84 for averaging signal intensity levels of pixels included in dark portion pattern data extracted by the dark portion pattern data extracting section 82 to calculate a dark portion data signal intensity average value; a first damage level discriminating section 85 for obtaining the difference between the bright portion data signal intensity average value calculated by the first average value calculating section 83 and the dark portion data signal intensity average value calculated by the second average value calculating section 84, selecting, based on a denomination determination signal input from the denomination determining section 66, a threshold value T1*j* of a coin 1 of a denomination determined by the denomination determining section 66 from among threshold values of coins 1 of each denomination stored in the reference damage data storing means 48, comparing the threshold value T1*j* with the difference between the bright portion data signal intensity average value and dark portion data signal intensity average value, discriminating, when the difference between the bright portion data signal intensity average value and dark portion data signal intensity average value is equal to or larger than the threshold value T1*j*, that the damage level of the lower surface of the coin 1 is equal to or lower than a predetermined level, discriminating, when the difference between the bright portion data signal intensity average value and dark portion data signal intensity average value is smaller than the threshold value T1*j*, that the damage level of the lower surface of the coin 1 is higher than the predetermined level and outputting a first damage level discrimination signal; a second damage level discriminating section 86 for obtaining the sum of the bright portion data signal intensity average value calculated by the first average value calculating section 83 and the dark portion data signal intensity average value calculated by the second average value calculating section 84, selecting, based on a denomination determination signal input from the denomination determining section 66, an algorithm for a coin 1 of a denomination determined by the denomination determining section 66 from among algorithms for coins 1 of each denomination stored in the reference damage data storing means 48, estimating the sum of the bright portion data signal intensity average value and dark portion data signal intensity average value in accordance with the thus selected algorithm, discriminating whether or not the damage level of the lower surface of the coin 1 exceeds a predetermined level and outputting a second damage level discrimination signal; a third damage level discriminating section 87 for selecting, based on a denomination determination signal input from the denomination determining section 66, a threshold value T2*j* of a coin 1 of a denomination determined by the denomination determining section 66 from among threshold values of coins 1 of each denomination stored in the reference damage data storing means 48, discriminating, when the degree to which the transformed pattern data coincides with the reference pattern data determined by comparing the transformed pattern data and the reference pattern data by the denomination determining section 66 is equal to or larger than the threshold value T2*j*, that the damage level of the lower surface of the coin 1 is equal to or lower than a predetermined level, discriminating, when the degree to which the transformed pattern data coincides with the reference pattern data is smaller than the threshold value T2*j*, that the damage level of the lower surface of the coin 1 exceeds the predetermined level and outputting a third damage level discrimination signal; and a damage level determining section 88 for determining whether or not the damage level of the lower surface of the coin 1 exceeds a predetermined level based on a first damage level discrimination signal input from the first damage level discriminating section 85, a second damage level discrimination signal input from the second damage level discriminating section 86 and a third damage level discrimination signal input from the third damage level discriminating section 87.

Figure 7:
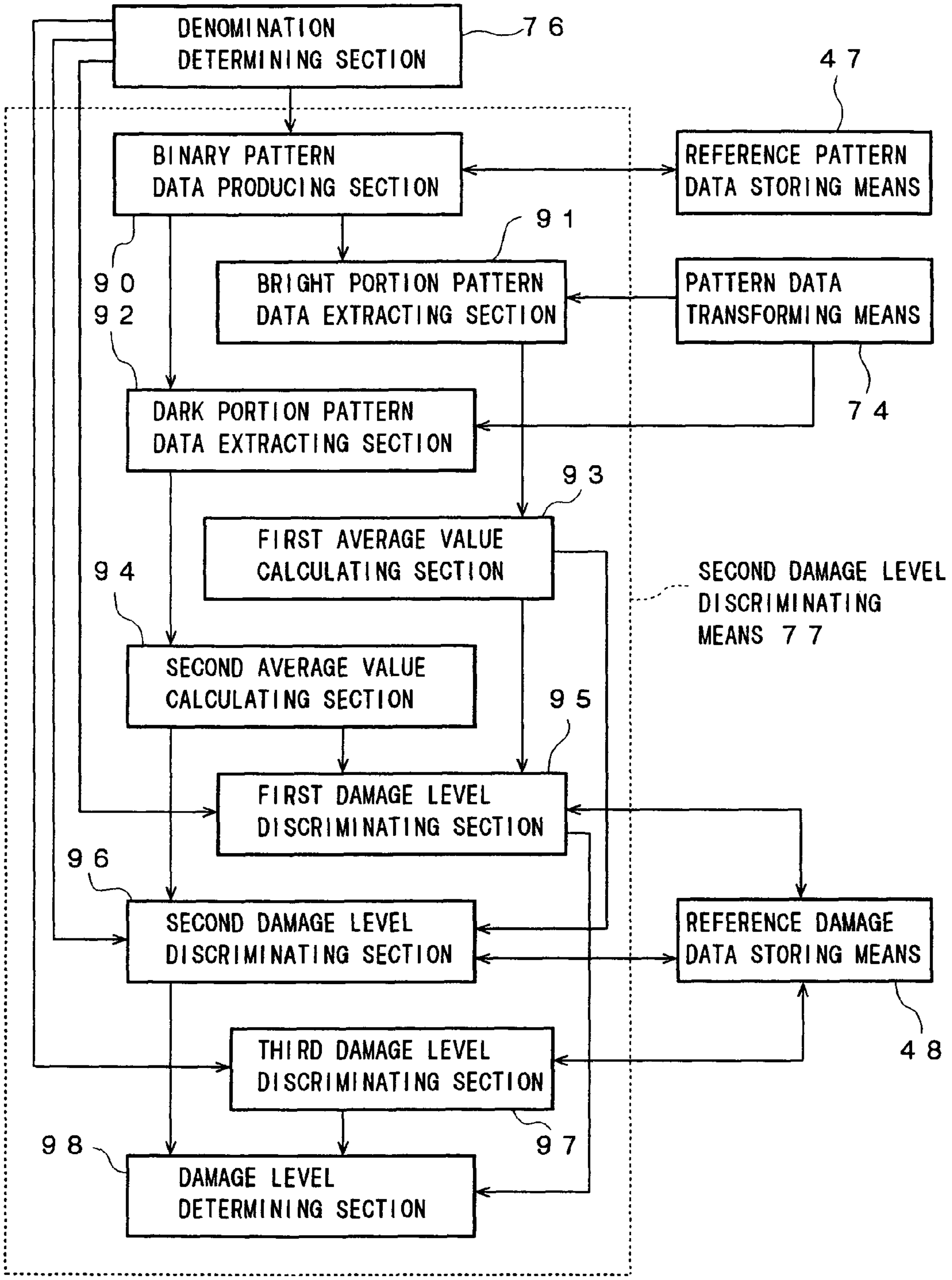
FIG. 7 is a block diagram of a second damage level determining means.

FIG. 7 is a block diagram of the second damage level determining means 77.

As shown in FIG. 7, the first damage level determining means 77 includes a binary pattern data producing section 90 for reading, based on a denomination determination signal input from the denomination determining section 76, reference pattern data of the obverse surface and the reverse surface of a coin 1 of a denomination discriminated by the denomination determining section 76 from among reference pattern data of the obverse surface and the reverse surface of coins 1 of each denomination mapped in the r-θ coordinate system and stored in the reference pattern data storing means 47, binarizing the reference pattern data so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data, outputting reference bright portion pattern data to a bright portion pattern data extracting section 91 and outputting reference dark portion pattern data to a dark portion pattern data extracting section 92; the bright portion pattern data extracting section 91 for extracting, based on reference bright portion pattern data input from the binary pattern data producing section 90, bright portion pattern data consisting of pixels corresponding to pixels included in reference bright portion pattern data from transformed pattern data mapped in the r-θ coordinate system and stored in the pattern data transforming means 74 of the second discriminating means 51; the dark portion pattern data extracting section 92 for extracting, based on reference dark portion pattern data input from the binary pattern data producing section 90, dark portion pattern data consisting of pixels corresponding to pixels included in reference dark portion pattern data from transformed pattern data mapped in the r-θ coordinate system and stored in the pattern data transforming means 74 of the second discriminating means 51; a first average value calculating section 93 for averaging signal intensity levels of pixels included in bright portion pattern data extracted by the bright portion pattern data extracting section 91 to calculate a bright portion data signal intensity average value; a second average value calculating section 94 for averaging signal intensity levels of pixels included in dark portion pattern data extracted by the dark portion pattern data extracting section 92 to calculate a dark portion data signal intensity average value; a first damage level discriminating section 95 for obtaining the difference between the bright portion data signal intensity average value calculated by the first average value calculating section 93 and the dark portion data signal intensity average value calculated by the second average value calculating section 94, selecting, based on a denomination determination signal input from the denomination determining section 76, a threshold value T1*k* of a coin 1 of a denomination determined by the denomination determining section 76 from among threshold values of coins 1 of each denomination stored in the reference damage data storing means 48, comparing the threshold value T1*k* with the difference between the bright portion data signal intensity average value and dark portion data signal intensity average value, discriminating, when the difference between the bright portion data signal intensity average value and dark portion data signal intensity average value is equal to or larger than the threshold value T1*k*, that the damage level of the upper surface of the coin 1 is equal to or lower than a predetermined level, discriminating, when the difference between the bright portion data signal intensity average value and dark portion data signal intensity average value is smaller than the threshold value T1*k*, that the damage level of the upper surface of the coin 1 is higher than the predetermined level and outputting a first damage level discrimination signal; a second damage level discriminating section 96 for obtaining the sum of the bright portion data signal intensity average value calculated by the first average value calculating section 93 and the dark portion, data signal intensity average value calculated by the second average value calculating section 94, selecting, based on a denomination determination signal input from the denomination determining section 76, an algorithm for a coin 1 of a denomination determined by the denomination determining section 76 from among algorithms for coins 1 of each denomination stored in the reference damage data storing means 48, estimating the sum of the bright portion data signal intensity average value and dark portion data signal intensity average value in accordance with the thus selected algorithm, discriminating whether or not the damage level of the upper surface of the coin 1 exceeds a predetermined level and outputting a second damage level discrimination signal; a third damage level discriminating section 97 for selecting, based on a denomination determination signal input from the denomination determining section 76, a threshold value T2*k* of a coin 1 of a denomination determined by the denomination determining section 76 from among threshold values of coins 1 of each denomination stored in the reference damage data storing means 48, discriminating, when the degree to which the transformed pattern data coincides with the reference pattern data determined by comparing the transformed pattern data and the reference pattern data by the denomination determining section 76 is equal to or larger than the threshold value T2*k*, that the damage level of the upper surface of the coin 1 is equal to or lower than a predetermined level, discriminating, when the degree to which the transformed pattern data coincides with the reference pattern data is smaller than the threshold value T2*k*, that the damage level of the upper surface of the coin 1 exceeds the predetermined level and outputting a third damage level discrimination signal; and a damage level determining section 98 for determining whether or not the damage level of the upper surface of the coin 1 exceeds a predetermined level based on a first damage level discrimination signal input from the first damage level discriminating section 95, a second damage level discrimination signal input from the second damage level discriminating section 96 and a third damage level discrimination signal input from the third damage level discriminating section 97.

The thus constituted coin discriminating apparatus according to the embodiment of the present invention discriminates whether or not a coin 1 is acceptable, whether or not the coin 1 is damaged to higher than a predetermined level and the denomination of the coin 1.

The coin 1 is pressed onto the upper surface of the coin passage member 3 by the transporting belt 6 and is fed in the coin passage 2 along a pair of guide rails 11, 11 in the direction indicated by an arrow A. The magnetic properties of the coin 1 are detected by the pair of magnetic sensors 12, 12 and the detection signals are output to the first discriminating means 50.

The first discriminating means 50 accesses the first reference data memory 45 when the detection signals are input from the magnetic sensors 12, 12, reads the reference magnetic data which indicate the magnetic properties of each denomination stored in the first reference data memory 45, discriminates the denomination of the coin 1 by comparing the reference magnetic data read from the first reference data memory 45 with the magnetic data of the coin 1 input from the magnetic sensors 12, 12 and outputs denomination discrimination signals to the second discriminating means 51, the third discriminating means 52 and the light emission control means 40.

When the coin 1 is further fed in the coin passage 2 to the first transparent passage portion 9 and blocks light emitted from the light emitting element 25 of each timing sensor 27, whereby the light receiving element 26 of each timing sensor 27 does not receive the light emitted from the corresponding light emitting element 25, timing signals are output from the timing sensors 27, 27 to the light emission control means 40 and the image reading control means 41.

When the timing signals are input from the timing sensors 27, 27, the light emission control means 40 outputs a light emission signal to the first light emitting means 21 based on the denomination discrimination signal from the first discriminating means 50 and causes the light emitting elements 20 to emit the amount of light that corresponds to the denomination of the coin 1 discriminated by the first discriminating means 50 toward the lower surface of the coin 1 located on the first transparent passage portion 9.

The reason why the amount of emitted light from the light emitting elements 20 is controlled based on the discriminating result of the denomination of the coin 1 by the first discriminating means 50 is because the amount of reflected light changes depending upon the material of the coin 1. If the same amount of light is emitted toward the coin 1, the image pattern of the coin 1 cannot be accurately detected.

That is, when the coin is made of a material having high light reflectivity such as nickel, aluminum or the like, it becomes difficult to accurately produce the image pattern data corresponding to the pattern of the surface of the coin 1 by detecting the reflected light from the surface of the coin 1. That is because the total amount of light detected by the sensor 24 becomes large and saturated if a large amount of light is illuminated. On the other hand, when the coin is made of a material having low light reflectivity such as copper, brass or the like, the image pattern data corresponding to the pattern on the surface of the coin 1 cannot be accurately produced by detecting the reflected light from the surface of the coin 1. That is because the total amount of detected light is too little if a small amount of light is illuminated. Thus, the light emission control means 40 is constituted such that when the coin 1 of the denomination discriminated by the first discriminating means 50 is made of a material having high light reflectivity such as nickel, aluminum or the like, the light emission control means 40 outputs a light emission signal to the first light emitting means 21 so that the light emitting elements 20 emits low intensity of light. On the other hand, it is constituted such that when the coin 1 of the denomination discriminated by the first discriminating means 50 is made of a material having low light reflectivity such as copper, brass or the like, the light emission control means 40 outputs the light emission signal to the first light emitting means 21 so that the light emitting elements 20 emits high intensity of light.

The image reading control means 41 causes the sensor 24 of the first image data producing means 22 to start detecting the light emitted from the light emitting elements 20 and reflected on the lower surface of the coin 1 when the timing signals from the timing sensors 27, 27 are input.

Since the first light emitting means 21 is disposed so as to be able to illuminate the coin 1 which advances on the first transparent passage portion 9 at a shallow angle, the light is reflected according to the raised and depressed pattern of the lower surface of the coin 1.

The light reflected from the surface of the coin 1 is directed toward the sensor 24 by the lens system 23 and photoelectrically detected by the sensor 24, whereby the image pattern data of the surface of the coin 1 are produced by the sensor 24.

The image pattern data of the lower surface of the coin 1 produced by the sensor 24 are digitized by the A/D converter 28. The digitized image pattern data are mapped and stored in the orthogonal coordinate system, namely, x-y coordinate system in the image pattern data memory 60 of the second discriminating means 51.

When the image pattern data of the lower surface of the coin 1 are stored in the image pattern data memory 60 of the second discriminating means 51, the first denomination discriminating section 61 of the second discriminating means 51 accesses the second reference data memory 46. It reads the data stored in the with regard to the diameter of the coin 1 and also the image pattern data stored in the image pattern data memory 60. By comparing those data, the first denomination discriminating section 61 of the second discriminating means 51 determines the denomination of the coin 1 and outputs a first denomination discrimination signal to the second denomination discriminating section 62.

There are some coins whose diameters are only slightly different from each other even though their denominations are different. When coins having a slightly larger diameter are worn out, their diameter can happen to coincide. Therefore, in some cases, the denomination of the coin 1 cannot be detected accurately by detecting its diameter. In this embodiment, the first discriminating means 50 determines the denomination of the coin 1 based on the magnetic properties of the coin 1 and outputs the denomination discrimination signal to the second denomination discriminating section 62. The first denomination discriminating section 61 of the second discriminating means 51 determines the denomination of the coin 1 based on the diameter of the coin 1 and outputs the first denomination discrimination signal to the second denomination discriminating section 62. When the denominations of the coin 1 determined by the first discriminating means 50 and the first denomination discriminating section 61 of the second discriminating means 51 based on these denomination discrimination signals do not coincide, it is constituted to determine that the coin 1 cannot be accepted. Therefore, when the first denomination discriminating section 61 of the second discriminating means 51 determines only one kind of denomination of the coin 1 based on the diameter of the coin 1, produces the first denomination discrimination signal and outputs it to the second denomination discriminating section 62, there is a possibility that the second denomination discriminating section 62 determines that the coin 1 is not acceptable even though the coin 1 is an acceptable coin.

Accordingly, in this embodiment, the first denomination discriminating section 61 of the second discriminating means 51 selects two denominations whose diameters are the closest and the second closest to the diameter of the detected coin 1 and outputs the first denomination discrimination signal to the second denomination discriminating section 62.

The second denomination discriminating section 62 of the second discriminating means 51 determines the denomination of the coin 1 based on the first discrimination signal input from the first discriminating means 50 and the first denomination discrimination signal input from the first denomination discriminating section 61 of the second discriminating means 51. When the determined results of the first discriminating means 50 and the first denomination discriminating section 61 of the second discriminating means 51 coincide, the second denomination discriminating section 62 of the second discriminating means 51 outputs the second denomination discrimination signal to the denomination determining section 66 of the second discriminating means 51. When they do not coincide, the coin 1 is a counterfeit coin or a foreign coin and therefore, it determines that it is not acceptable and outputs an unacceptable coin detection signal to the coin discriminating means 54.

On the other hand, the center coordinate determining section 63 determines the center coordinate of the image pattern data mapped and stored in the orthogonal coordinate system, namely, the x-y coordinate system and stored in the image pattern data memory 60 and outputs the center coordinate to the pattern data transforming means 64.

Figure 8:
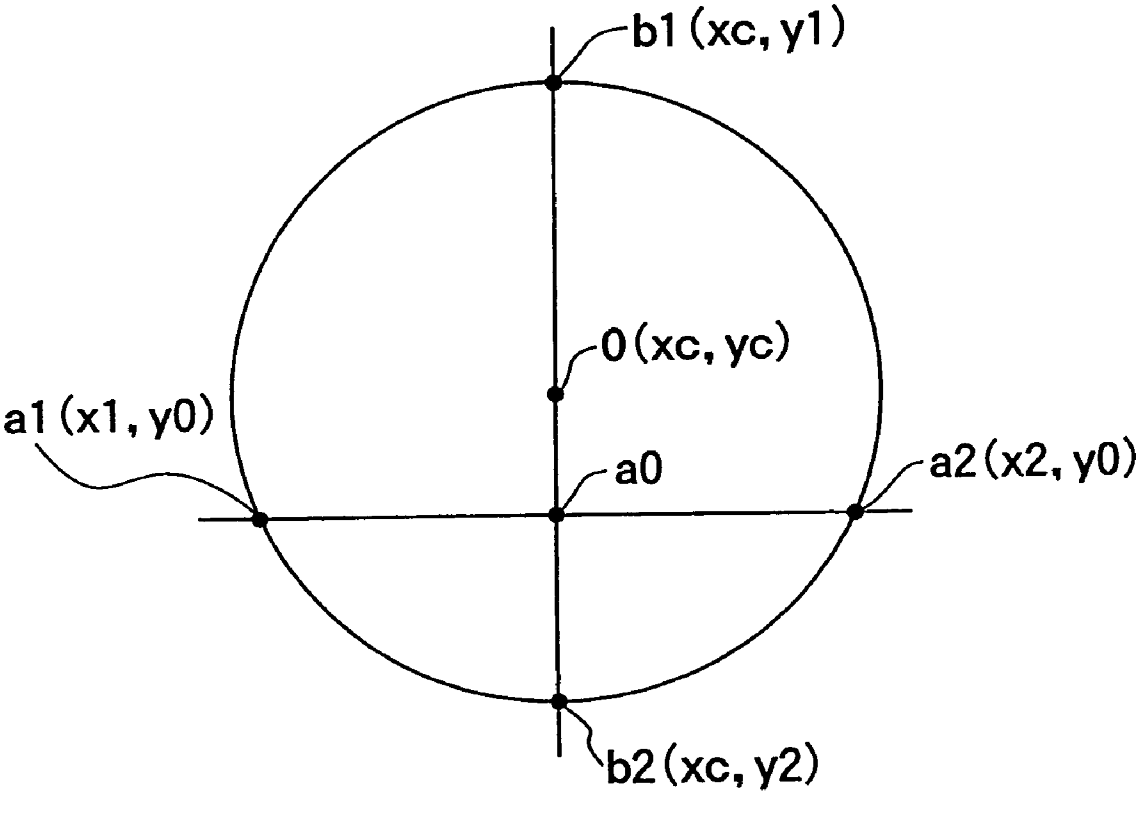
FIG. 8 is a schematic view showing a method for determining the center coordinate of pattern data effected by a center coordinate determining means.

FIG. 8 is a schematic view showing a method for determining the center coordinate of pattern data effected by the center coordinate determining means 63.

As shown in FIG. 8, the pattern data of the coin 1 produced by the sensor 24 are mapped in the orthogonal coordinate system, i.e., the x-y coordinate system and stored in the image pattern data memory 60. The center coordinate determining section 63 first determines x-coordinates x1 and x2 of boundary data a1 and a2 whose y-coordinate is y0 of the pattern data mapped and stored in the image pattern data memory 60 and determines an x-coordinate xc=(x1+x2)/2 of a center data a0 between the boundary data a1 and a2.

Then, the center coordinate determining section 63 draws an imaginary straight line from the data a0 perpendicular to a straight line extending through the boundary data a1 and a2 to determine y-coordinates y1 and y2 of boundary data b1 and b2 which correspond to the points of intersection of the imaginary straight line and the boundary of the pattern data and determines a y-coordinate yc=(y1+y2)/2 of center data ○ between the boundary data b1 and b2.

The thus determined coordinates (xc, yc) of the data ○ corresponds to the center coordinate of the pattern data of the coin 1 mapped in the x-y coordinate system and the data ○ corresponds to the data center of the pattern data of the coin 1 mapped in the x-y coordinate system.

Figure 9:
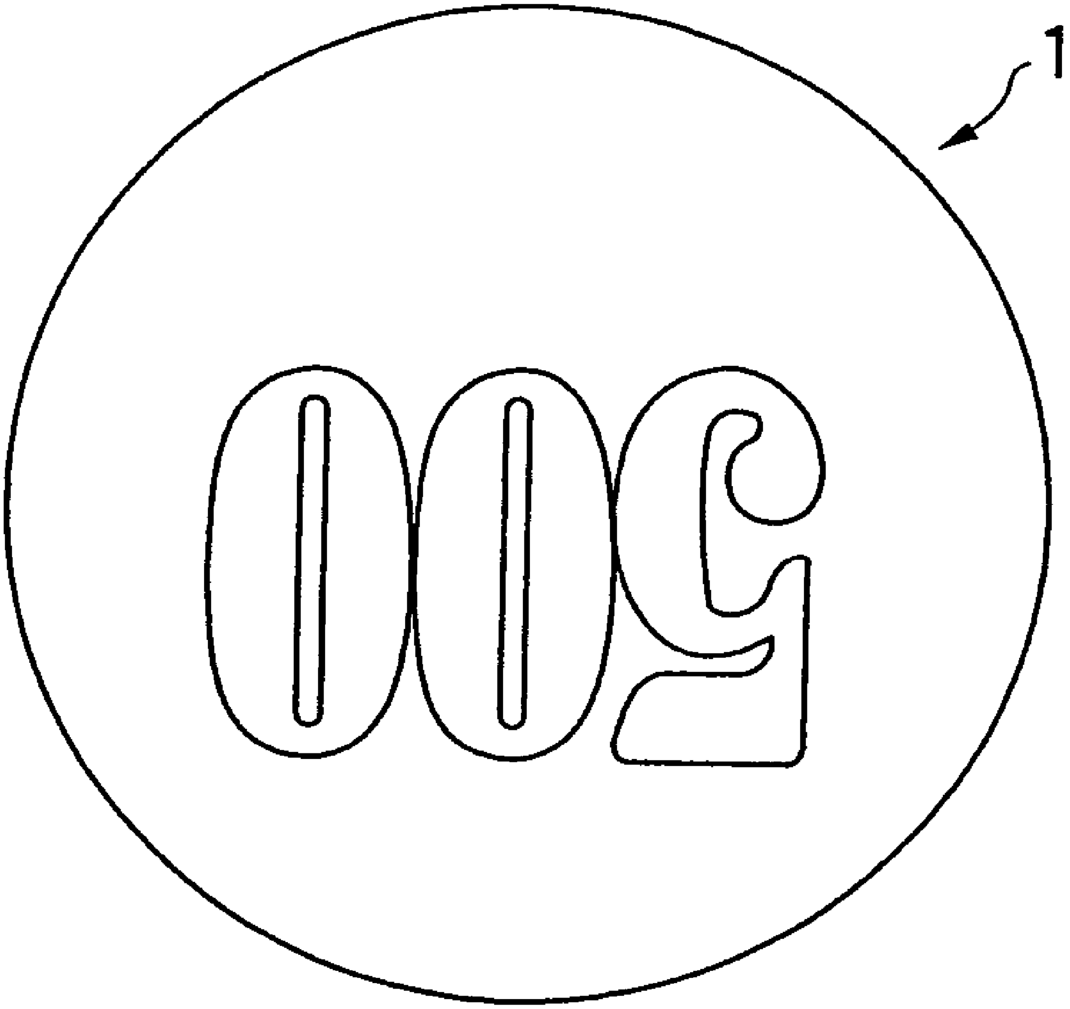
FIG. 9 is a view showing one example of pattern data of a coin produced by a sensor and mapped and stored in a image pattern data memory.

FIG. 9 is a view showing one example of pattern data of the coin 1 produced by the sensor 24 and mapped and stored in the image pattern data memory 60.

Based on the center coordinates (xc, yc) of the pattern data of the coin 1 input from the center coordinate determining means 63, the pattern data transforming means 64 transforms the pattern data of the coin 1 mapped in the x-y coordinate system and stored in the image pattern data memory 60 into an r-θ coordinate system.

Figure 10:
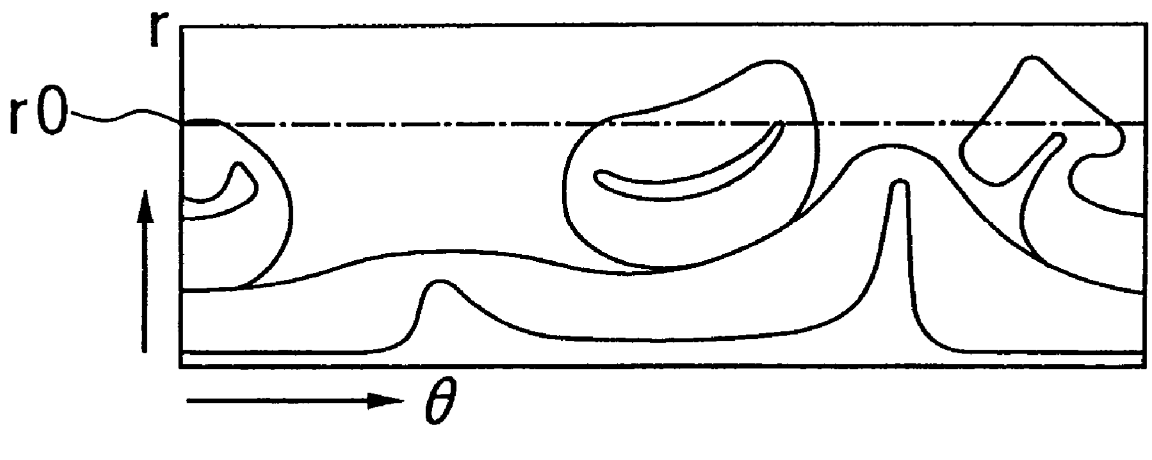
FIG. 10 is a view showing transformed pattern data produced by transforming the pattern data shown in FIG. 9 into an r-θ coordinate system by pattern data conversion.

FIG. 10 is a view showing transformed pattern data produced by transforming the pattern data shown in FIG. 9 into the r-θ coordinate system by pattern data transforming means 64 based upon the center coordinate (xc, yc) of the pattern data of the coin 1 determined by the center coordinate determining section 63. In FIG. 10, the ordinate represents the distance r from the data center ○ in the x-y coordinate system and the abscissa represents an angle θ about the data center ○.

The pattern data transformed into the r-θ coordinate system by the pattern data transforming means 64 in this manner are stored in the pattern data transforming means 64.

The transformed pattern data stored in the pattern data transforming means 64 are then read by the data processing means 65 and the data processing means 65 effects edge enhancement processing on the transformed pattern data and outputs them to the denomination determining section 66.

When the transformed pattern data subjected to edge enhancement processing are input from the data processing means 65, the denomination determining section 66 reads reference pattern data of the reverse surface of the coin 1 of the denomination discriminated by the second denomination discriminating section 62 based on the second denomination discrimination signal input from the second denomination discriminating section 62 from among reference pattern data of the obverse surface and the reverse surface of coins 1 of each denomination mapped in the r-θ coordinate system and stored in the reference pattern data storing means 47.

Figure 11:
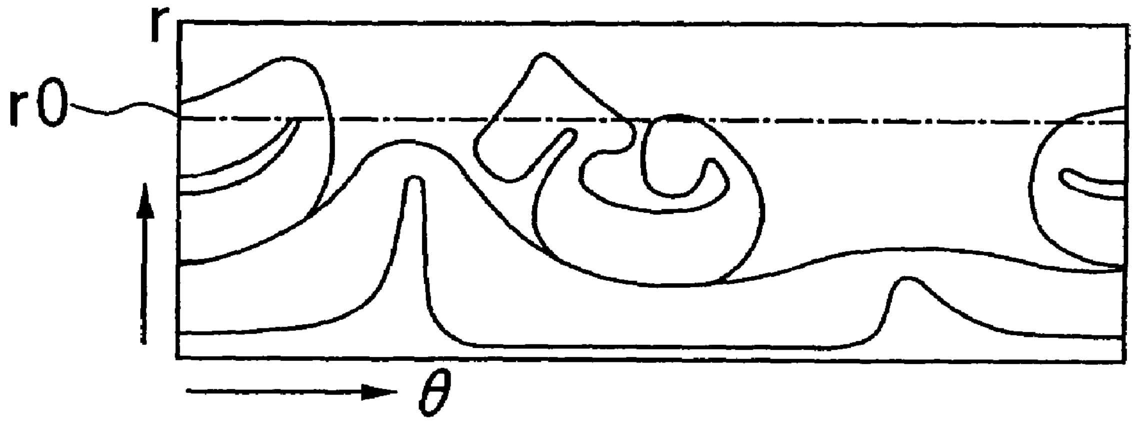
FIG. 11 a view showing reference pattern data of a coin mapped in an r-θ coordinate system and corresponding to transformed pattern data shown in FIG. 10.

FIG. 11 shows an example of the reference pattern data of the coin 1 mapped in the r-θ coordinate system and corresponding to the transformed pattern data shown in FIG. 10.

Since the transformed pattern data shown in FIG. 10 are obtained in the pattern data transforming means 64 by transforming the pattern data in the x-y coordinate system into the r-θ coordinate system based on the center coordinates (xc, yc) of the pattern data of the coin 1 determined by the center coordinate determining section 63, the zero point of the ordinate, namely, the zero point of the r-axis coincides with the zero point of the reference pattern data shown in FIG. 11. However, since the orientation of the coin 1 to be discriminated is usually offset angularly (rotationally) from that of the coin 1 used for producing the reference pattern data, the pattern data in FIG. 10 and the reference pattern data in FIG. 11 at the same θ value are normally obtained from different portions of the coin 1.

Accordingly, it is impossible to discriminate whether or not the coin 1 is acceptable and the denomination of the coin 1 by directly comparing the transformed pattern data in FIG. 10 and the reference pattern data in FIG. 11 and, therefore, it is necessary to correct the transformed pattern data prior to the comparison so that the zero point of the transformed pattern data in the θ axis coincides with the zero point of the reference pattern data in the θ axis.

Figure 12:
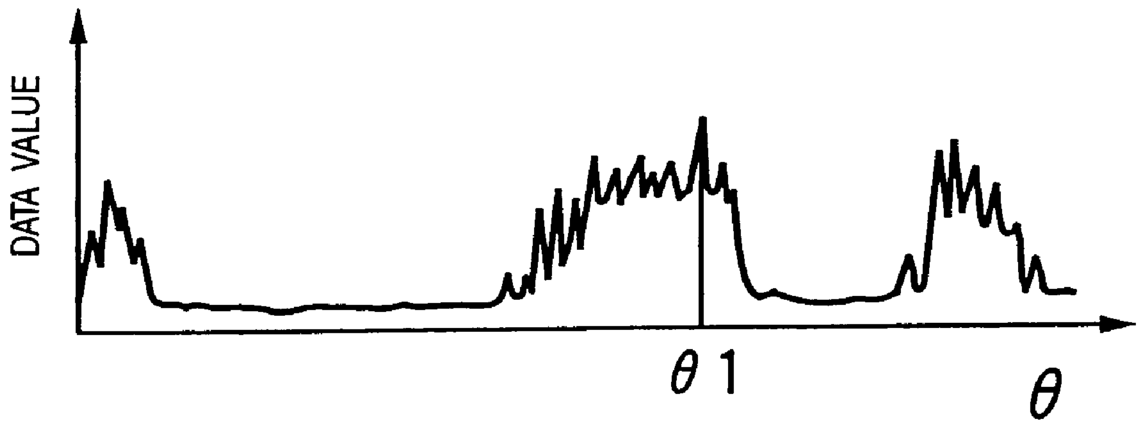
FIG. 12 is a graph showing pattern data values obtained by reading the transformed pattern data shown in FIG. 10 over 360 degrees at a predetermined distance r0 from a data center.

In view of the above, the second optical discriminating means 68 reads the pattern data values at a predetermined distance r0 from the data center of the transformed pattern data shown in FIG. 11, namely, reads the pattern data values whose ordinate values are equal to a predetermined value r0 over 360 degrees, and reads the pattern data values at a predetermined distance r0 from the data center of the reference pattern data shown in FIG. 12, namely, reads the pattern data values whose ordinate values are equal to a predetermined value r0 over 360 degrees. Then, the second optical discriminating means 68 compares the two sets of pattern data values, thereby correcting the deviation of the transformed pattern data in the θ axis caused by the angular offset of the coin 1.

In view of the above, the denomination determining section 66 reads the pattern data values at a predetermined distance r0 from the data center of the transformed pattern data shown in FIG. 10, namely, reads the pattern data values whose ordinate values are equal to a predetermined value r0 over 360 degrees, and reads the pattern data values at a predetermined distance r0 from the data center of the reference pattern data shown in FIG. 11, namely, reads the pattern data values whose ordinate values are equal to a predetermined value r0 over 360 degrees. Then, the denomination determining section 66 compares the two sets of pattern data values, thereby correcting the deviation of the transformed pattern data in the θ axis caused by the angular offset of the coin 1.

Figure 13:
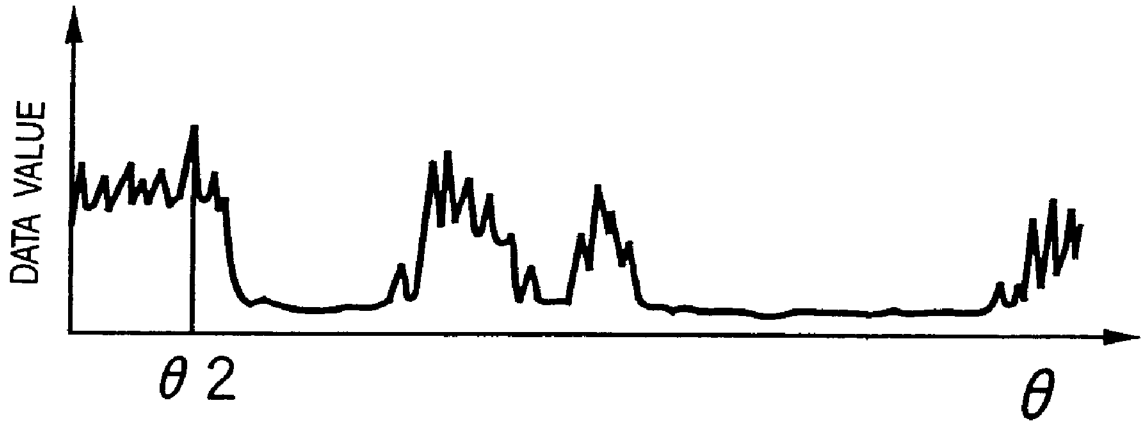
FIG. 13 is a graph showing pattern data values obtained by reading reference pattern data shown in FIG. 11 over 360 degrees at a predetermined distance r0 from the data center.

FIG. 12 is a graph showing pattern data values obtained by reading the transformed pattern data shown in FIG. 10 over 360 degrees at a predetermined distance r0 from the data center and FIG. 13 is a graph showing pattern data values obtained by reading reference pattern data shown in FIG. 11 over 360 degrees at a predetermined distance r0 from the data center. In FIGS. 12 and 13, the ordinate represents data values and the abscissa represents the angle.

Coins 1 are fed through the coin passage 2, while being guided by the pair of guide rails 11, 11 and, therefore, the center of each coin 1 passes along a predetermined locus on the first transparent passage portion 9. On the contrary, the coin 1 is usually offset angularly from the coin used to produce the reference pattern data. Therefore, since the sets of pattern data at the same θ value in FIGS. 10 and 11 are normally obtained from different portions of the coin 1, it is necessary to correct the transformed pattern data prior to the comparison so that the zero point of the transformed pattern data in the θ axis coincides with the zero point of the reference pattern data in the θ axis.

Figure 14:
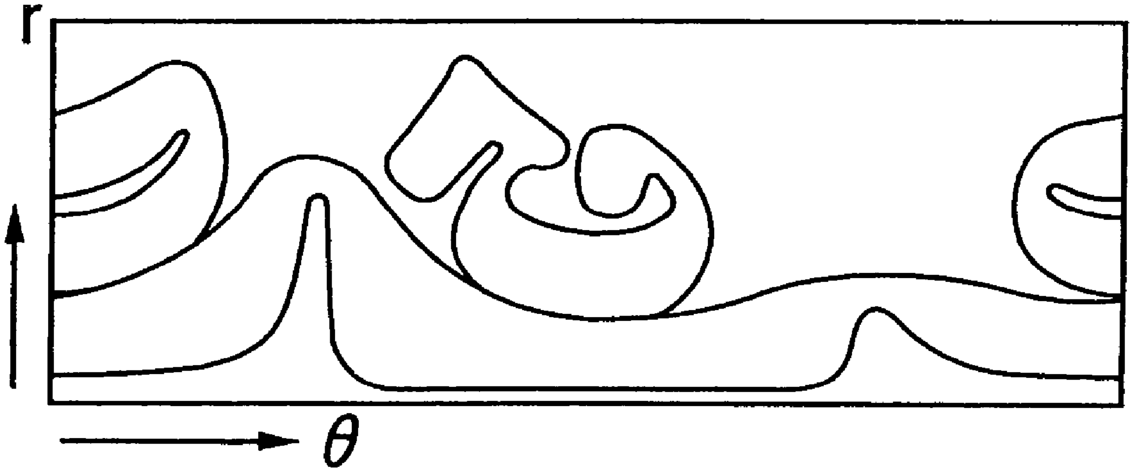
FIG. 14 is a view showing transformed pattern data after remapping.

Accordingly, the denomination determining section 66 obtains θ values θ1 and θ2 at which the pattern data value shown in FIG. 12 and the pattern data value shown in FIG. 13 are maximum respectively and remaps the transformed pattern data shown in FIG. 10 so that θ1 becomes equal to θ2. FIG. 14 shows the thus remapped transformed pattern data.

The denomination determining section 66 compares the transformed pattern data subjected to edge enhancement processing by the data processing means 65 and remapped in the above described manner as shown in FIG. 14 with the reference pattern data shown in FIG. 11, and in accordance with the degree to which the transformed pattern data coincides with the reference pattern data, it determines whether the coin 1 is a coin of the denomination discriminated by the second denomination discriminating section 62 or an unacceptable coin.

However, since it is impossible to feed the coin 1 so that one surface thereof always faces upward, if the coin 1 is fed in such a manner that the reverse surface faces upward, the remapped transformed pattern data never coincides with the reference pattern data of the reverse surface of the coin 1 of the denomination determined by the second denomination discriminating means 62 of the second discriminating means 51. Therefore, when the remapped transformed pattern data does not coincide with the reference pattern data of the reverse surface of the coin 1 of the denomination selected in accordance with the result of discrimination made by the second denomination discriminating means 62 of the second discriminating means 51, if the coin 1 is immediately discriminated as a counterfeit coin or a foreign coin, the coin discrimination accuracy becomes lowered.

Accordingly, in this embodiment, the transformed pattern data is first compared with the reference pattern data of the reverse surface of the coin 1 of the denomination determined by the second denomination discriminating means 62 of the second discriminating means 51 and if they do not coincide, the transformed pattern data is compared with the reference pattern data of the obverse surface of the coin 1 of the denomination in the same manner, thereby discriminating whether the denomination of the coin 1 coincides with that tentatively determined by the second denomination discriminating means 62 of the second discriminating means 51 and whether or not the coin 1 is an unacceptable coin such as a counterfeit coin, a foreign coin or the like.

As a result, when the denomination determining section 66 of the second discriminating means 51 discriminates that the coin 1 is unacceptable, it outputs an unacceptable coin detection signal to the coin discriminating means 54.

To the contrary, when the denomination determining section 66 of the second discriminating means 51 discriminates that the denomination of the coin 1 is the same as that discriminated by the second denomination discriminating section 62 of the second discriminating means 51, it outputs a denomination determination signal to the coin discriminating means 54 and also outputs a coin surface identification signal identifying which pattern data were used for determining the denomination of the coin 1 among pattern data of the obverse surface and the reverse surface of the coin 1, and the θ value θ1 at which the transformed pattern data values become maximum and the θ value θ2 at which the reference pattern data values become maximum or the offset value (θ1-θ2) or (θ2-θ1) in the θ axis direction to the first damage level discriminating means 67 together with the denomination determination signal and pattern matching data indicating the degree to which the transformed pattern data coincides with the reference pattern data.

The denomination determination signal and the coin surface identification signal output from the denomination determining section 66 are input to the binary pattern data producing section 80, the first damage level discriminating section 85 and the second damage level discriminating section 86 of the first damage level discriminating means 67, and the denomination determination signal, the pattern matching data and the coin surface identification signal output from the denomination determining section 66 are input to the third damage level discriminating section 87.

The denomination determination signal and the coin surface identification signal are input to the binary pattern data producing section 80, and when the binary pattern data producing section 80 receives the denomination determination signal and the coin surface identification signal, it reads, based on the denomination determination signal and the coin surface identification signal, reference pattern data of the surface identified by the coin surface identification signal of the coin 1 of the denomination determined by the denomination determining section 66 from among reference data of the obverse surface and the reverse surface of coins 1 mapped in the r-θ coordinate system and stored in the reference pattern data storing means 47. Then, the binary pattern data producing section 80 binarizes the reference pattern data so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data and outputs the reference bright portion pattern data to the bright portion pattern data extracting section 81 and outputs the reference dark portion pattern data to the dark portion pattern data extracting section 82.

When the bright portion pattern data extracting section 81 receives the reference bright portion pattern data from the binary pattern data producing section 80, it extracts, based on the reference bright portion pattern data and considering the offset value (θ1-θ2) or (θ2-θ1) in the θ axis direction, bright portion pattern data consisting of pixels corresponding to pixels included in the reference bright portion pattern data from among the transformed pattern data mapped in the r-θ coordinate system and stored in the pattern data transforming means 64 and outputs the bright portion pattern data to the first average value calculating section 83.

When the first average value calculating section 83 receives the bright portion pattern data from the bright portion pattern data extracting section 81, it averages the signal intensity levels of pixels included in the bright portion pattern data to calculate a bright portion signal intensity average value and outputs it to the first damage level discriminating section 85 and the second damage level discriminating section 86.

On the other hand, when the dark portion pattern data extracting section 82 receives the reference dark portion pattern data from the binary pattern data producing section 80, it extracts, based on the reference dark portion pattern data and considering the offset value (θ1-θ2) or (θ2-θ1) in the θ axis direction, dark portion pattern data consisting of pixels corresponding to pixels included in the reference dark portion pattern data from among the transformed pattern data mapped in the r-θ coordinate system and stored in the pattern data transforming means 64 and outputs the dark portion pattern data to the second average value calculating section 84.

When the second average value calculating section 84 receives the dark portion pattern data from the dark portion pattern data extracting section 82, it averages the signal intensity levels of pixels included in the dark portion pattern data to calculate a dark portion signal intensity average value and outputs it to the first damage level discriminating section 85 and the second damage level discriminating section 86.

When the first damage level discriminating section 85 receives the bright portion signal intensity average value from the first average value calculating section 83 and the dark portion signal intensity average value from the second average value calculating section 84, it obtains the difference between the bright portion signal intensity average value and dark portion signal intensity average value. Based on the denomination determination signal and the coin surface identification signal input from the denomination determining section 66, the first damage level discriminating section 85 then selects from among threshold values of coins 1 of each denomination and surface stored in the reference damage data storing means 48 a threshold value of the corresponding surface of the coin 1 of the denomination discriminated by the denomination determining section 66 and compares it with the difference between the bright portion signal intensity average value and dark portion signal intensity average value.

In a study done by the inventors of the present invention, it was found that light reflected from an edge portion of a coin 1 has generally high intensity but when a coin 1 has been in circulation for a long time and damaged, the resulting wear of the edge portion thereof causes the bright portion data signal intensity average value obtained therefrom to be lower than that obtained from an undamaged coin 1, and that, on the other hand, the intensity of light reflected from a flat portion of a coin 1 is generally low but when a coin 1 has been in circulation for a long time and damaged, the resulting irregular light reflection owing to scratching and/or staining of the flat portion of the coin 1 causes the dark portion data signal intensity average value obtained therefrom to be higher than that obtained from an undamaged coin 1.

Therefore, since the difference between the bright portion signal intensity average value and dark portion signal intensity average value is large in a coin whose damage level is low and the difference between the bright portion signal intensity average value and dark portion signal intensity average value becomes smaller as the damage level of the coin 1 increases, it is possible to accurately discriminate whether or not the coin 1 is damaged to higher than a predetermined level by selecting from among threshold values of coins 1 of each denomination and surface stored in the reference damage data storing means 48 a threshold value T1*j* of the corresponding surface of the coin 1 of the denomination discriminated by the denomination determining section 66 and comparing the difference between the bright portion signal intensity average value and dark portion signal intensity average value with the threshold value T1*j*.

When, upon comparing the difference between the bright portion signal intensity average value and dark portion signal intensity average value with the threshold value T1*j* read from the reference damage data storing means 48, the first damage level discriminating section 85 judges that the difference between the bright portion signal intensity average value and dark portion signal intensity average value is equal to or larger than the threshold value T1*j*, it discriminates that the damage level of the lower surface of the coin 1 is equal to or lower than a predetermined level and outputs a first damage level discrimination signal to the damage level determining section 88.

To the contrary, when the first damage level discriminating section 85 judges that the difference between the bright portion signal intensity average value and dark portion signal intensity average value is smaller than the threshold value T1*j*, it discriminates that the lower surface of the coin 1 is damaged to higher than the predetermined level and outputs a first damage level discrimination signal to the damage level determining section 88.

On the other hand, when the second damage level discriminating section 86 receives the bright portion signal intensity average value from the first average value calculating section 83 and the dark portion signal intensity average value from the second average value calculating section 84, it obtains the sum of the bright portion signal intensity average value and dark portion signal intensity average value. Based on the denomination determination signal and the coin surface identification signal input from the denomination determining section 66, the second damage level discriminating section 86 then selects from among algorithms for coins 1 of each denomination and surface stored in the reference damage data storing means 48 the algorithm for the corresponding surface of the coin 1 of the denomination discriminated by the denomination determining section 66 and estimates the sum of the bright portion signal intensity average value and dark portion signal intensity average value in accordance with the thus selected algorithm.

More specifically, in a study done by the inventors of the present invention, it was found that in the case where a coin 1 is made of a cupronickel system material, a brass system material or a bronze system material, the decrease in the bright data signal intensity average value caused by the wear of an edge portion of a coin 1 is greater than the increase in the dark data signal intensity average value caused by irregular reflection of light owing to scratching and/or staining of the flat portion of the coin 1 sustained when the coin 1 is damaged, and, as a result, the sum of the bright portion signal intensity average value and dark portion signal intensity average value obtained from a coin 1 whose damage level is low is large and the sum of the bright portion signal intensity average value and dark portion signal intensity average value becomes smaller as the damage level of a coin 1 increases. Therefore, it is possible to discriminate whether or not a coin 1 is damaged to higher than a predetermined level by comparing the sum of the bright portion signal intensity average value and dark portion signal intensity average value with a threshold value defined for each denomination and surface of coins 1.

Accordingly, for coins 1 made of a cupronickel system material, a brass system material or a bronze system material, the reference damage data storing means 48 stores an algorithm whereby, when the sum of the bright portion signal intensity average value and dark portion signal intensity average value is equal to or larger than a threshold value T3*i* of each denomination and surface, it is discriminated that the damage level of the lower surface of the coin 1 is equal to or lower than a predetermined level, and whereby, when the sum of the bright portion signal intensity average value and dark portion signal intensity average value is smaller than the threshold value T3*i*, it is discriminated that he lower surface of the coin 1 is damaged to higher than the predetermined level.

To the contrary, in a study done by the inventors of the present invention, it was found that in the case where a coin 1 is made of aluminum, the increase in the dark data signal intensity average value caused by irregular reflection of light owing to scratching and/or staining of the flat portion of the coin 1 sustained when the coin 1 is damaged is greater than the decrease in the bright data signal intensity average value caused by the wear of an edge portion of a coin 1, and, as a result, the sum of the bright portion signal intensity average value and dark portion signal intensity average value obtained from a coin 1 whose damage level is low is low and the sum of the bright portion signal intensity average value and dark portion signal intensity average value becomes larger as the damage level of a coin 1 increases. Therefore, it is possible to discriminate whether or not a coin 1 is damaged to higher than a predetermined level by comparing the sum of the bright portion signal intensity average value and dark portion signal intensity average value with a threshold value defined for each denomination and surface of coins 1.

Accordingly, for coins 1 made of aluminum, the reference damage data storing means 48 stores an algorithm whereby, when the sum of the bright portion signal intensity average value and dark portion signal intensity average value is equal to or larger than a threshold value T4*i* of each denomination and surface, it is discriminated that the lower surface of the coin 1 is damaged to higher than the predetermined level and when the sum of the bright portion signal intensity average value and dark portion signal intensity average value is smaller than the threshold value T4*i*, it is discriminated that the damage level of the lower surface of the coin 1 is equal to or lower than a predetermined level.

When the second damage level discriminating section 86 has, based on the denomination determination signal and the coin surface identification signal input from the denomination determining section 66, selected from among algorithms for coins 1 of each denomination and surface stored in the reference damage data storing means 48 an algorithm for the corresponding surface of the coin 1 of the denomination discriminated by the denomination determining section 66 and estimated the sum of the bright portion signal intensity average value and dark portion signal intensity average value in accordance with the thus selected algorithm, thereby discriminating the damage level of the lower surface of the coin 1, the second damage level discriminating section 86 outputs the second damage level discrimination signal to the damage level determining section 88.

The denomination determination signal and the coin surface identification signal output from the denomination determining section 66 are also input to the third damage level discriminating section 87. When the third damage level discriminating section 87 receives the denomination determination signal and the coin surface identification signal, it selects, based on the denomination determination signal and the coin surface identification signal input from the denomination determining section 66, from among threshold values of coins 1 of each denomination and surface stored in the reference damage data storing means 48 a threshold value T2*j* of the corresponding surface of the coin 1 of the denomination discriminated by the denomination determining section 66 and compares it with the pattern matching data which indicates the degree to which the transformed pattern data coincides with the reference pattern data and was input from the denomination determining section 66.

In the case where a coin 1 is damaged, since the edge portion and the surface of the coin 1 are worn, it is general that the degree of the coincidence between the transformed pattern data and the reference pattern data is low and the degree of the coincidence between the transformed pattern data and the reference pattern data becomes lower as the damage level of the coin 1 increases. Therefore, it is possible to discriminate whether or not the coin 1 is damaged to higher than a predetermined level by comparing the pattern matching data indicating the degree to which the transformed pattern data coincides with the reference pattern data with the threshold value T2*j* defined for each denomination and surface of the coin 1.

When, upon comparing the pattern matching data with the threshold value T2*j* read from the reference damage data storing means 48, the third damage level discriminating section 87 judges that the pattern matching data indicating the degree to which the transformed pattern data coincides with the reference pattern data is equal to or larger than the threshold value T2*j*, it discriminates that the damage level of the lower surface of the coin 1 is equal to or lower than the predetermined level and outputs the third damage level discrimination signal to the damage level determining section 88.

To the contrary, when the third damage level discriminating section 87 judges that the pattern matching data indicating the degree to which the transformed pattern data coincides with the reference pattern data is smaller than the threshold value T2*j*, it discriminates that the lower surface of the coin 1 is damaged to higher than the predetermined level and outputs the third damage level discrimination signal to the damage level determining section 88.

Based on the first damage level discrimination signal input from the first damage level discriminating section 85, the second damage level discrimination signal input from the second damage level discriminating section 86 and the third damage level discrimination signal input from the third damage level discriminating section 87, the damage level determining section 88 finally determines whether or not the damage level of the lower surface of the coin 1 exceeds a predetermined level.

Specifically, when, based on the first damage level discrimination signal input from the first damage level discriminating section 85, the second damage level discrimination signal input from the second damage level discriminating section 86 and the third damage level discrimination signal input from the third damage level discriminating section 87, the damage level determining section 88 judges that each of the first damage level discriminating section 85, the second damage level discriminating section 86 and the third damage level discriminating section 87 has discriminated that the damage level of the lower surface of the coin 1 is equal to or lower than the corresponding predetermined level, the damage level determining section 88 finally discriminates that the damage level of the lower surface of the coin 1 is equal to or lower than the predetermined level.

On the other hand, when, based on the first damage level discrimination signal input from the first damage level discriminating section 85, the second damage level discrimination signal input from the second damage level discriminating section 86 and the third damage level discrimination signal input from the third damage level discriminating section 87, the damage level determining section 88 judges that each of the first damage level discriminating section 85, the second damage level discriminating section 86 and the third damage level discriminating section 87 has discriminated that the lower surface of the coin 1 is damaged to higher than the corresponding predetermined level, the damage level determining section 88 finally discriminates that the lower surface of the coin 1 is damaged to higher than the corresponding predetermined level and outputs a damaged coin detection signal to the coin discriminating means 54.

To the contrary, when, based on the first damage level discrimination signal input from the first damage level discriminating section 85, the second damage level discrimination signal input from the second damage level discriminating section 86 and the third damage level discrimination signal input from the third damage level discriminating section 87, the damage level determining section 88 judges that the results of discrimination made by the first damage level discriminating section 85, the second damage level discriminating section 86 and the third damage level discriminating section 87 do not coincide with each other, then, since the results of discrimination based on the difference between the bright portion data signal intensity average value and dark portion data signal intensity average value are generally most reliable, the damage level determining section 88 finally discriminates in accordance with the results of discrimination made by the first damage level discriminating section 85 that the damage level of the lower surface of the coin 1 is equal to or lower than the predetermined level or finally discriminates that the lower surface of the coin 1 is damaged to higher than the predetermined level and outputs a damaged coin detection signal to the coin discriminating means 54.

When the coin 1 is further fed to the second transparent passage portion 10 and light emitted from the light emitting element 35 of each timing sensor 37 is blocked by the coin 1 and the light receiving element 36 does not receive the light emitted from the light emitting element 35, timing signals are output from the timing sensors 37, 37 to the light emission control means 40 and the image reading control means 41.

When the light emission control means 40 receives the timing signals from the timing sensors 37, 37, it outputs a light emission signal to the second light emitting means 31 based on the denomination discrimination signal from the first discriminating means 50 and causes the light emitting elements 30 to emit the amount of light that corresponds to the denomination of the coin 1 discriminated by the first discriminating means 50 toward the upper surface of the coin 1 located on the second transparent passage portion 10.

The reason why the amount of emitted light from the light emitting elements 30 is controlled based on the discriminating result of the denomination of the coin 1 by the first discriminating means 50 is because the amount of reflected light changes depending upon the material of the coin 1. If the same amount of light is emitted toward the coin 1, the image pattern of the coin 1 cannot be accurately detected.

When the image reading control means 41 receives the timing signals from the timing sensors 37, 37, it causes the sensor 34 of the second image data producing means 32 to start detecting the light emitted from the light emitting elements 30 and reflected on the upper surface of the coin 1.

Since the second light emitting means 31 is disposed so as to be able to illuminate the coin 1 which advances on the second transparent passage portion 10 at a shallow angle, the light is reflected according to the raised and depressed pattern of the upper surface of the coin 1.

The light reflected from the upper surface of the coin 1 is directed toward the sensor 34 by the lens system 33 and photoelectrically detected by the sensor 34, whereby the image pattern data of the upper surface of the coin 1 are produced by the sensor 34.

The image pattern data of the upper surface of the coin 1 produced by the sensor 34 are digitized by the A/D converter 38. The digitized image pattern data are mapped and stored in the orthogonal coordinate system, namely, x-y coordinate system in the image pattern data memory 70 of the third discriminating means 52.

When the image pattern data of the upper surface of the coin 1 are stored in the image pattern data memory 70 of the third discriminating means 52, the first denomination discriminating section 71 of the third discriminating means 52 accesses the second reference data memory 46. It reads the reference diameter data stored in the second reference data memory 46 with regard to the diameter of the coin 1 and also the image pattern data stored in the image pattern data memory 70. By comparing those data, the first denomination discriminating section 71 of the third discriminating means 52 determines the denomination of the coin 1 and outputs a first denomination discrimination signal to the second denomination discriminating section 72.

In this embodiment, based on the detected diameter of the coin 1, the first denomination discriminating section 71 of the third discriminating means 52 selects two denominations, whose diameters are the closest and the second closest to the diameter of the detected coin 1 and outputs the first denomination discrimination signal to the second denomination discriminating section 72.

The second denomination discriminating section 72 determines the denomination of the coin 1 based on the first discrimination signal input from the first discriminating means 50 and the first denomination discrimination signal input from the first denomination discriminating section 71 of the third discriminating means 52. When the second denomination discriminating section 72 judges that the determined results of the first discriminating means 50 and the first denomination discriminating section 71 of the third discriminating means 52 coincide, it outputs a second denomination discrimination signal to the denomination determining section 76 of the third discriminating means 53. On the other hand, when the second denomination discriminating section 72 judges that they do not coincide, it discriminates that the coin 1 is an unacceptable coin such as a counterfeit coin or a foreign coin and outputs an unacceptable coin detection signal to the coin discriminating means 54.

On the other hand, the center coordinate determining section 73 determines the center coordinate of the image pattern data mapped and stored in the orthogonal coordinate system, namely, the x-y coordinate system, and stored in the image pattern data memory 70 and outputs the center coordinate to the pattern data transforming section 74.

Based on the center coordinates (xc, yc) of the pattern data of the coin 1 input from the center coordinate determining means 73, the pattern data transforming means 74 transforms the pattern data of the coin 1 mapped in the x-y coordinate system and stored in the image pattern data memory 70 into an r-θ coordinate system.

The pattern data transformed into the r-θ coordinate system by the pattern data transforming means 74 in this manner are stored in the pattern data transforming means 74.

The transformed pattern data stored in the pattern data transforming means 74 are then read by the data processing means 75 and the data processing means 75 effects edge enhancement processing the transformed pattern data and outputs them to the denomination determining section 76.

When the transformed pattern data subjected to edge enhancement processing are input from the data processing means 75, the denomination determining section 76 reads reference pattern data of the obverse surface of the coin 1 of the denomination discriminated by the second denomination discriminating section 72 based on the second denomination discrimination signal input from the second denomination discriminating section 72 from among reference pattern data of the obverse surface and the reverse surface of coins 1 of each denomination mapped in the r-θ coordinate system and stored in the reference pattern data storing means 47.

In the exactly same manner as described above regarding the denomination determining section 66 of the second discriminating means 51, the denomination determining section 76 of the third discriminating means 52 corrects the offset of the transformed pattern data subjected to edge enhancement processing in the θ axis direction, remaps the transformed pattern data and effects pattern matching on the transformed pattern data with the reference pattern data, thereby determining whether the coin 1 is a coin of the denomination discriminated by the second denomination discriminating section 72 or an unacceptable coin.

As a result, when the denomination determining section 76 of the third discriminating means 52 judges that the transformed pattern data do not coincide with the reference pattern data of the obverse surface of the coin 1 of the denomination discriminated by the second denomination discriminating section 72, it further compares the transformed pattern data with the reference pattern data of the reverse surface of the coin 1 of the denomination in the exactly same manner as described above regarding the denomination determining section 66 of the second discriminating means 51 and discriminates whether the coin 1 is a coin of the denomination tentatively determined by the second denomination discriminating section 72 or an unacceptable coin such as a counterfeit coin, a foreign coin or the like.

When the denomination determining section 76 of the third discriminating means 52 discriminates that the coin 1 is an unacceptable coin, it outputs an unacceptable coin detection signal to the coin discriminating means 54.

To the contrary, when the denomination determining section 76 of the third discriminating means 52 discriminates that the coin 1 is a coin of the denomination discriminated by the second denomination discriminating section 72, it outputs a denomination determination signal to the coin discriminating means 54 and further outputs a coin surface identification signal identifying which pattern data were used for determining the denomination of the coin 1 among pattern data of the obverse surface and the reverse surface of the coin 1 to the second damage level discriminating section 77 together with the denomination determination signal and the pattern matching data indicating the degree to which the transformed pattern data coincides with the reference pattern data.

The denomination determination signal and the coin surface identification signal output from the denomination determining section 76 are input to the binary pattern data producing section 90, the first damage level discriminating section 95 and the second damage level discriminating section 96 of the second damage level discriminating means 77 and the denomination determination signal, the pattern matching data and the coin surface identification signal output from the denomination determining section 76 are input to the third damage level discriminating section 97 of the second damage level discriminating means 77.

The denomination determination signal and the coin surface identification signal are input to the binary pattern data producing section 90 of the second damage level discriminating means 77 and when the binary pattern data producing section 90 receives the denomination determination signal and the coin surface identification signal, it reads, based on the denomination determination signal and the coin surface identification signal, reference pattern data of the surface identified by the coin surface identification signal of the coin 1 of the denomination determined by the denomination determining section 76 from among reference data of the obverse surface and the reverse surface of coins 1 mapped in the r-θ coordinate system and stored in the reference pattern data storing means 47. Then, the binary pattern data producing section 90 binarizes the reference pattern data so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data and outputs the reference bright portion pattern data to the bright portion pattern data extracting section 91 and outputs the reference dark portion pattern data to a dark portion pattern data extracting section 92.

When the bright portion pattern data extracting section 91 receives the reference bright portion pattern data from the binary pattern data producing section 90, it extracts, based on the reference bright portion pattern data and considering the offset value (θ1-θ2) or (θ2-θ1) in the θ axis direction, bright portion pattern data consisting of pixels corresponding to pixels included in the reference bright portion pattern data from among the transformed pattern data mapped in the r-θ coordinate system and stored in the pattern data transforming means 64 and outputs the bright portion pattern data to the first average value calculating section 93.

When the first average value calculating section 93 receives the bright portion pattern data from the bright portion pattern data extracting section 91, it averages the signal intensity levels of pixels included in the bright portion pattern data to calculate a bright portion signal intensity average value and outputs it to the first damage level discriminating section 95 and the second damage level discriminating section 96.

On the other hand, when the dark portion pattern data extracting section 92 receives the reference dark portion pattern data from the binary pattern data producing section 90, it extracts, based on the reference dark portion pattern data and considering the offset value (θ1-θ2) or (θ2-θ1) in the θ axis direction, dark portion pattern data consisting of pixels corresponding to pixels included in the reference dark portion pattern data from among the transformed pattern data mapped in the r-θ coordinate system and stored in the pattern data transforming means 74 and outputs the dark portion pattern data to the second average value calculating section 94.

When the second average value calculating section 94 receives the dark portion pattern data from the dark portion pattern data extracting section 92, it averages the signal intensity levels of pixels included in the dark portion pattern data to calculate a dark portion signal intensity average value and outputs it to the first damage level discriminating section 95 and the second damage level discriminating section 96.

When the first damage level discriminating section 95 receives the bright portion signal intensity average value from the first average value calculating section 93 and the dark portion signal intensity average value from the second average value calculating section 94, it obtains the difference between the bright portion signal intensity average value and dark portion signal intensity average value. Based on the denomination determination signal and the coin surface identification signal input from the denomination determining section 76, the first damage level discriminating section 95 then selects from among threshold values of coins 1 of each denomination and surface stored in the reference damage level data storing means 48 a threshold value T1*k* of the corresponding surface of the coin 1 of the denomination discriminated by the denomination determining section 76 and compares it with the difference between the bright portion signal intensity average value and dark portion signal intensity average value.

As a result, when the first damage level discriminating section 95 judges that the difference between the bright portion signal intensity average value and dark portion signal intensity average value is equal to or larger than the threshold value T1*k*, it discriminates that the damage level of the upper surface of the coin 1 is equal to or lower than a predetermined level and outputs a first damage level discrimination signal to the damage level determining section 98.

To the contrary, when the first damage level discriminating section 95 judges that the difference between the bright portion signal intensity average value and dark portion signal intensity average value is smaller than the threshold value T1*k*, it discriminates that the upper surface of the coin 1 damaged to higher than the predetermined level and outputs a first damage level discrimination signal to the damage level determining section 98.

On the other hand, when the second damage level discriminating section 96 receives the bright portion signal intensity average value from the first average value calculating section 93 and the dark portion signal intensity average value from the second average value calculating section 94, it obtains the sum of the bright portion signal intensity average value and dark portion signal intensity average value. Based on the denomination determination signal and the coin surface identification signal input from the denomination determining section 76, the second damage level discriminating section 96 then selects from among algorithms for coins 1 of each denomination and surface stored in the reference damage level data storing means 48 an algorithm for the corresponding surface of the coin 1 of the denomination discriminated by the denomination determining section 76 and estimates the sum of the bright portion signal intensity average value and dark portion signal intensity average value in accordance with the thus selected algorithm.

When the second damage level discriminating section 96 has selected, based on the denomination determination signal and the coin surface identification signal input from the denomination determining section 76, the algorithm for the corresponding surface of the coin 1 of the denomination discriminated by the denomination determining section 76 from among algorithms for coins 1 of each denomination and surface stored in the reference damage level data storing means 48 and estimated the sum of the bright portion signal intensity average value and dark portion signal intensity average value in accordance with the thus selected algorithm, thereby discriminating the damage level of the upper surface of the coin 1, the second damage level discriminating section 96 outputs the second damage level discrimination signal to the damage level determining section 98.

The denomination determination signal and the coin surface identification signal output from the denomination determining section 76 are also input to the third damage level discriminating section 97. When the third damage level discriminating section 97 receives the denomination determination signal and the coin surface identification signal, it selects, based on the denomination determination signal and the coin surface identification signal input from the denomination determining section 76, from among threshold values of coins 1 of each denomination and surface stored in the reference damage data storing means 48 a threshold value T2*k* of the corresponding surface of the coin 1 of the denomination discriminated by the denomination determining section 76 and compares it with the pattern matching data which indicates the degree to which the transformed pattern data coincides with the reference pattern data and was input from the denomination determining section 76.

As a result, when the third damage level discriminating section 97 judges that the pattern matching data indicating the degree to which the transformed pattern data coincides with the reference pattern data is equal to or larger than the threshold value T2*k*, it discriminates that the damage level of the upper surface of the coin 1 is equal to or lower than the predetermined level and outputs the third damage level discrimination signal to the damage level determining section 98.

To the contrary, when the third damage level discriminating section 97 judges that the pattern matching data indicating the degree to which the transformed pattern data coincides with the reference pattern data is smaller than the threshold value T2*k*, it discriminates that the upper surface of the coin 1 is damaged to higher than the predetermined level and outputs the third damage level discrimination signal to the damage level determining section 98.

Based on the first damage level discrimination signal input from the first damage level discriminating section 95, the second damage level discrimination signal input from the second damage level discriminating section 96 and the third damage level discrimination signal input from the third damage level discriminating section 97, the damage level determining section 98 finally determines whether or not the damage level of the upper surface of the coin 1 exceeds a predetermined level.

Specifically, based on the first damage level discrimination signal input from the first damage level discriminating section 95, the second damage level discrimination signal input from the second damage level discriminating section 96 and the third damage level discrimination signal input from the third damage level discriminating section 97, when the damage level determining section 98 judges that each of the first damage level discriminating section 95, the second damage level discriminating section 96 and the third damage level discriminating section 97 has discriminated that the damage level of the upper surface of the coin 1 is equal to or lower than the corresponding predetermined level, the damage level determining section 98 finally discriminates that the damage level of the upper surface of the coin 1 is equal to or lower than the predetermined level.

On the other hand, based on the first damage level discrimination signal input from the first damage level discriminating section 95, the second damage level discrimination signal input from the second damage level discriminating section 96 and the third damage level discrimination signal input from the third damage level discriminating section 97, when the damage level determining section 98 judges that each of the first damage level discriminating section 95, the second damage level discriminating section 96 and the third damage level discriminating section 97 has discriminated that the upper surface of the coin 1 is damaged to higher than the corresponding predetermined level, the damage level determining section 98 finally discriminates that the upper surface of the coin 1 is damaged to higher than the corresponding predetermined level and outputs a damaged coin detection signal to the coin discriminating means 54.

To the contrary, based on the first damage level discrimination signal input from the first damage level discriminating section 95, the second damage level discrimination signal input from the second damage level discriminating section 96 and the third damage level discrimination signal input from the third damage level discriminating section 97, when the damage level determining section 98 judges that the results of discrimination made by the first damage level discriminating section 95, the second damage level discriminating section 96 and the third damage level discriminating section 97 do not coincide with each other, since the results of discrimination based on the difference between the bright portion data signal intensity average value and dark portion data signal intensity average value are generally most reliable, the damage level determining section 98 finally discriminates in accordance with the results of discrimination made by the first damage level discriminating section 95 that the damage level of the upper surface of the coin 1 is equal to or lower than the predetermined level or finally discriminates that the upper surface of the coin 1 is damaged to higher than the predetermined level and outputs a damaged coin detection signal to the coin discriminating means 54.

When, based on the denomination determination signal and the coin surface identification signal input from the denomination determining section 66 of the second discriminating means 51 and the denomination determination signal and the coin surface identification signal input from the denomination determining section 76 of the third discriminating means 52, the coin discriminating means 54 judges that the denomination of the coin 1 discriminated by the second discriminating means 51 and the denomination of the coin 1 discriminated by the third discriminating means 52 coincide with each other, and the surface of the coin 1 discriminated by the second discriminating means 51 is one surface thereof and the surface of the coin 1 discriminated by the third discriminating means 52 is the other surface thereof, it finally discriminates that the coin 1 is an acceptable coin of the denomination discriminated by the second discriminating means 51 and the third discriminating means 52.

To the contrary, when an unacceptable coin detection signal has been input from the denomination determining section 66 of the second discriminating means 51, when an unacceptable coin detection signal has been input from the denomination determining section 76 of the third discriminating means 52, when the coin discriminating means 54 judges based on the denomination determination signal input from the denomination determining section 66 of the second discriminating means 51 and the denomination determination signal input from the denomination determining section 76 of the third discriminating means 52 that the denomination of the coin 1 discriminated by the second discriminating means 51 and the denomination of the coin 1 discriminated by the third discriminating means 52 do not coincide with each other, or when the coin discriminating means 54 judges based on the denomination determination signal and the coin surface identification signal input from the denomination determining section 66 of the second discriminating means 51 and the denomination determination signal and the coin surface identification signal input from the denomination determining section 76 of the third discriminating means 52 that the denomination of the coin 1 discriminated by the second discriminating means 51 and the denomination of the coin 1 discriminated by the third discriminating means 52 coincide with each other but does not judge that the surface of the coin 1 discriminated by the second discriminating means 51 is one surface thereof and the surface of the coin 1 discriminated by the third discriminating means 52 is the other surface thereof, the coin discriminating means 54 discriminates that the coin 1 is an unacceptable coin such as a counterfeit coin, a foreign coin or the like and outputs an unacceptable coin detection signal to a display means (not shown), thereby causing it to display information indicating that an unacceptable coin such as a counterfeit coin, a foreign coin or the like was detected.

Further, when a damaged coin detection signal has been input from the damage level determining section 88 of the first damage level discriminating means 67 or when a damaged coin detection signal has been input from the damage level determining section 98 of the second damage level discriminating means 77, the coin discriminating means 54 discriminates that the coin 1 is a damaged coin whose damage level exceeds the predetermined level and outputs a damaged coin detection signal to the display means (not shown), thereby causing it to display information indicating that a damaged coin whose damage level exceeds the predetermined level was detected.

In this manner, coins discriminated unacceptable and coins discriminated as damaged coins whose damage level exceeds the predetermined level are sorted and collected separately from coins discriminated acceptable.

According to the above described embodiment, whether or not a coin 1 is acceptable and the denomination of the coin 1 as well as whether or not the coin 1 is damaged to higher than the predetermined level are discriminated based on the pattern data of one surface of the coin 1 produced by the first image data producing means 22 by photoelectrically detecting light emitted from the light emitting elements 20 and reflected by the one surface of the coin 1 by the sensor 24 and the pattern data of the other surface of the coin 1 produced by the second image data producing means 32 by photoelectrically detecting light emitted from the light emitting elements 30 and reflected by the other surface of the coin 1 by the sensor 34. Therefore, it is possible to discriminate whether or not a coin 1 is acceptable, the denomination of the coin 1 and whether or not the coin 1 is damaged to higher than the predetermined level without making the size of the apparatus larger, only by disposing the first pattern data detecting unit 4 constituted by the first light emitting means 21 and the first image data producing means 22 and the second pattern data detecting unit 5 constituted by the second light emitting means 31 and the second image data producing means 32 along the coin passage 2, and the coin discriminating apparatus can be made smaller.

Further, utilizing the new finding that as the damage level of a coin 1 increases, the bright portion signal intensity average value becomes low and as the damage level of a coin 1 increases, the dark portion signal intensity average value becomes high, the above described embodiment discriminates whether or not a coin 1 is damaged to higher than a predetermined level by comparing the difference between the bright portion signal intensity average value and dark portion signal intensity average value with the threshold value $T1j$. Therefore, it is possible to discriminate whether or not a coin 1 is damaged to higher than a predetermined level with high accuracy.

Furthermore, according to the above described embodiment, since the data processing means 65, 75 effects edge enhancement processing on the transformed pattern data transformed into an r-θ coordinate system and whether or not the coin 1 is acceptable and the denomination of the coin 1 are discriminated by comparing the thus processed transformed pattern data with the reference pattern data transformed into an r-θ coordinate system, it is possible to discriminate whether or not the coin 1 is acceptable and the denomination of the coin 1 with high accuracy.

Moreover, according to the above described embodiment, since whether or not a coin 1 is acceptable and the denomination of the coin 1 as well as whether or not the coin 1 is damaged to higher than a predetermined level are discriminated based on patterns of both surfaces of the coin 1, it is possible to discriminate whether or not the coin 1 is acceptable and the denomination of the coin 1 with high accuracy and it is further possible to reliably discriminate whether or not the coin 1 is damaged to higher than a predetermined level.

Figure 15:
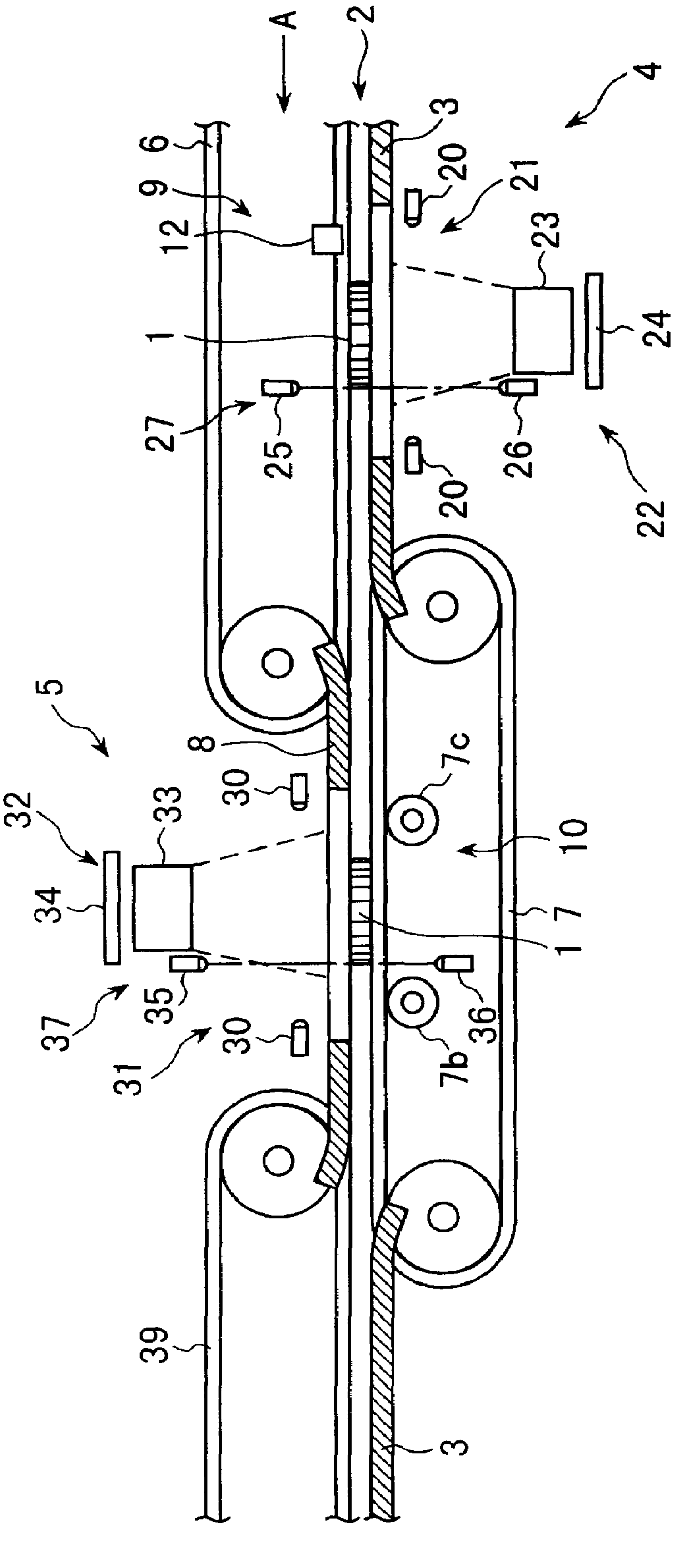
FIG. 15 is a schematic longitudinal cross-sectional view of a coin discriminating apparatus which is another preferred embodiment of the present invention.

FIG. 15 is a schematic longitudinal cross-sectional view of a coin discriminating apparatus which is another preferred embodiment of the present invention.

As shown in FIG. 15, in the coin discriminating apparatus according to this embodiment, the coin passage member 3 is cut off over a region extending from an upstream portion of the second pattern data detection unit 5 to a downstream portion thereof and a transporting belt 7 is provided there so as to be disposed above the upper surface of the coin passage member 3. Therefore, a coin 1 which has been transported by the transporting belt 6 while the lower surface thereof has been supported by the upper surface of the coin passage member 3 is fed to the second pattern data detection unit 5 while the lower surface thereof is being supported by the transporting belt 7.

When pattern data of the upper surface of the coin 1 are detected by the second pattern data detection unit 5, the coin 1 is further fed downstream in the coin passage 2 while it is being pressed onto the upper surface of the coin passage member 3 by a transporting belt 39.

In this embodiment, in the region of the first pattern data detection unit 4, a coin 1 is transported while it is being pressed onto the upper surface of the first transparent passage portion 9 formed in the coin passage member 3 by the transporting belt 6 and is irradiated via the first transparent portion 9 with light emitted from the light emitting elements 20 disposed below the coin passage member 3 and light reflected from the lower surface of the coin 1 is photoelectrically detected by the sensor 24, thereby producing pattern data of the lower surface of the coin 1. Further, the coin 1 is delivered from the coin passage member 3 onto transporting belt 7 and transported while the lower surface thereof is being supported by the transporting belt 7 so that it is being pressed onto the lower surface of the coin passage forming member 8 provided above the transporting belt 7 and is irradiated via the second transparent passage portion 10 formed in the coin passage forming member 8 with light emitted from the light emitting elements 30 disposed above the coin passage forming member 8 and light reflected from the upper surface of the coin 1 is photoelectrically detected by the sensor 34, thereby producing pattern data of the upper surface of the coin 1. Therefore, according to the above described embodiment, it is possible to detect optical patterns of both surfaces of a coin 1 in a desired manner while the coin 1 is being transported and to discriminate, based on the thus obtained pattern data of both surfaces of the coin 1, whether or not the coin 1 is acceptable, the denomination of the coin 1 and damage degree of the coin 1.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, when, based on the first damage level discrimination signal input from the first damage level discriminating section 85, the second damage level discrimination signal input from the second damage level discriminating section 86 and the third damage level discrimination signal input from the third damage level discriminating section 87, the damage level determining section 88 judges that the results of discrimination made by the first damage level discriminating section 85, the second damage level discriminating section 86 and the third damage level discriminating section 87 do not coincide with each other, it finally discriminates in accordance with the results of discrimination made by the first damage level discriminating section 85 that the damage level of the lower surface of the coin 1 is equal to or lower than the predetermined level or finally discriminates that the lower surface of the coin 1 is damaged to higher than the predetermined level and outputs a damaged coin detection signal to the coin discriminating means 54. On the other hand, when, based on the first damage level discrimination signal input from the first damage level discriminating section 95, the second damage level discrimination signal input from the second damage level discriminating section 96 and the third damage level discrimination signal input from the third damage level discriminating section 97, the damage level determining section 98 judges that the results of discrimination made by the first damage level discriminating section 95, the second damage level discriminating section 96 and the third damage level discriminating section 97 do not coincide with each other, it finally discriminates in accordance with the results of discrimination made by the first damage level discriminating section 95 that the damage level of the upper surface of the coin 1 is equal to or lower than the predetermined level or finally discriminates that the upper surface of the coin 1 is damaged to higher than the predetermined level and outputs a damaged coin detection signal to the coin discriminating means 54. However, it is possible to multiply the results of discrimination based on the difference between the bright portion signal intensity average value and dark portion signal intensity average value, the results of discrimination based on the sum of the bright portion signal intensity average value and dark portion signal intensity average value and the results of discrimination based on the pattern matching data by weighting factors and totally discriminate whether or not the coin 1 is damaged to higher than a predetermined level based thereon.

Further, in the above described embodiments, although whether or not the coin 1 is damaged to higher than a predetermined level is discriminated based on the difference between the bright portion signal intensity average value and dark portion signal intensity average value, the sum of the bright portion signal intensity average value and dark portion signal intensity average value and the pattern matching data, it is not absolutely necessary to discriminate whether or not the coin 1 is damaged to higher than a predetermined level based on the three factors consisting of the difference between the bright portion signal intensity average value and dark portion signal intensity average value, the sum of the bright portion signal intensity average value and dark portion signal intensity average value and the pattern matching data, and whether or not the coin 1 is damaged to higher than a predetermined level may be discriminated based on one or two factors among the difference between the bright portion signal intensity average value and dark portion signal intensity average value, the sum of the bright portion signal intensity average value and dark portion signal intensity average value and the pattern matching data.

Furthermore, in the above described embodiments, the first damage level discriminating means 67 includes the binary pattern data producing section 80 which reads, based on the denomination determination signal and the coin surface identification signal input from the denomination determining section 66, reference pattern data of the obverse surface and the reverse surface of the coin 1 of the denomination determined by the denomination determining section 66 from among reference pattern data of the obverse surface and the reverse surface of coins 1 of each denomination mapped in the r-θ coordinate system and stored in the reference pattern data storing means 47, binarizes the reference pattern data so that “1” is assigned to pixel data having a signal intensity level equal to or higher than a predetermined signal intensity level and “0” is assigned to pixel data having a signal intensity level lower than the predetermined signal intensity level, thereby producing reference bright portion pattern data consisting of “1” pixel data and reference dark portion pattern data consisting of “0” pixel data and outputs the reference bright portion pattern data to the bright portion pattern data extracting section 81 and outputs the reference dark portion pattern data to a dark portion pattern data extracting section 82, and the second damage level discriminating means 67 includes the binary pattern data producing section 90 which reads, based on the denomination determination signal and the coin surface identification signal input from the denomination determining section 76, reference pattern data of the obverse surface and the reverse surface of the coin 1 of the denomination determined by the denomination determining section 76 from among reference pattern data of the obverse surface and the reverse surface of coins 1 of each denomination mapped in the r-θ coordinate system and stored in the reference pattern data storing means 47, binarizes the reference pattern data so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data and outputs the reference bright portion pattern data to the bright portion pattern data extracting section 91 and outputs the reference dark portion pattern data to a dark portion pattern data extracting section 92. However, it is possible to binarize in advance reference pattern data of the obverse surface and the reverse surface of a coin 1 of each denomination so that "1" is assigned to pixel data having a signal intensity level equal to or higher than a predetermined signal intensity level and "0" is assigned to pixel data having a signal intensity level lower than the predetermined signal intensity level, thereby producing reference bright portion pattern data consisting of "1" pixel data and reference dark portion pattern data consisting of "0" pixel data, store them in the reference pattern data storing means 47, and cause the bright portion pattern data extracting section 81 and the dark portion pattern data extracting section 82 of the first damage level discriminating means 67 and the bright portion pattern data extracting section 91 and the dark portion pattern data extracting section 92 of the second damage level discriminating means 67 to read the reference bright portion pattern data and the reference dark portion pattern data stored in the reference pattern data storing means 47 and extract the bright portion pattern data and the dark portion pattern data. In such a case, it is possible to shorten time required for calculation and improve the efficiency of discrimination of coins 1.

Moreover, in the above described embodiments, although the pattern data of the obverse surface and the reverse surface of the coin 1 are produced using the monochrome type sensor 24 and the monochrome type sensor 34, it is possible to produce color pattern data using color sensors instead of the monochrome type sensor 24 and the monochrome type sensor 34, discriminate whether or not a coin 1 is damaged to higher than a predetermined level based on the difference between the bright portion signal intensity average value and dark portion signal intensity average value, the sum of the bright portion signal intensity average value and dark portion signal intensity average value and the pattern matching data, produce chromaticity data and lightness data of the obverse surface and the reverse surface of the coin 1 based on R data, G data and B data in the color pattern data of the obverse surface and the reverse surface of the coin 1, and compare them with reference chromaticity data and reference lightness data, thereby discriminating whether or not a coin 1 is damaged to higher than a predetermined level.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide a coin discriminating method and apparatus for reliably discriminating whether or not coins are acceptable, the denominations of coins and whether or not coins are damaged to higher than a predetermined level by optically detecting coin surface patterns while preventing the apparatus from becoming large.

The invention claimed is:

1. A coin discriminating method comprising steps of irradiating a surface of a coin with light, photoelectrically detecting light reflected by the surface of the coin, producing detected pattern data of the surface of the coin, binarizing corresponding reference pattern data so that "1" is assigned to pixel data having a signal intensity level equal to or higher than a predetermined signal intensity level and "0" is assigned to pixel data having a signal intensity level lower than the predetermined signal intensity level to produce reference bright portion pattern data consisting of "1" pixel data and reference dark portion pattern data consisting of "0" pixel data, extracting, based on the thus produced reference bright portion pattern data and reference dark portion pattern data, bright portion pattern data consisting of pixels corresponding to pixels included in the reference bright portion pattern data and dark portion pattern data consisting of pixels corresponding to pixels included in the reference dark portion pattern data from the detected pattern data, averaging signal intensity levels of the pixels included in the bright portion pattern data to calculate a bright portion data signal intensity average value, averaging signal intensity levels of the pixels included in the dark portion pattern data to calculate a dark portion data signal intensity average value, calculating a difference between the bright portion data signal intensity average value and dark portion data signal intensity average value, comparing it with a threshold value of coins of a corresponding denomination among threshold values defined for each denomination, and discriminating that a damage level of the surface of the coin is equal to or lower than a predetermined level when the difference between the bright portion data signal intensity average value and dark portion data signal intensity average value is equal to or larger than the threshold value and discriminating that the surface of the coin is damaged to higher than the predetermined level when the difference between the bright portion data signal intensity average value and dark portion data signal intensity average value is smaller than the threshold value.

2. A coin discriminating method in accordance with claim 1 which further comprises steps of calculating the sum of the bright portion signal intensity average value and dark portion signal intensity average value and estimating the sum of the bright portion signal intensity average value and dark portion signal intensity average value in accordance with an algorithm for the corresponding denomination, thereby discriminating whether or not the coin is damaged to higher than the predetermined level.

3. A coin discriminating method in accordance with claim 2 which further comprises steps of comparing the detected pattern data and the reference pattern data by pattern matching to detect a degree to which the detected pattern data and the reference pattern data coincide with each other, comparing the degree to which the detected pattern data and the reference pattern data coincide with each other with a threshold value of coins of a corresponding denomination among threshold values defined for each denomination of coins, and discriminating that a damage level of the surface of the coin is equal to or lower than a predetermined level when the degree to which the detected pattern data and the reference pattern data coincide with each other is equal to or larger than the threshold value and that the surface of the coin is damaged to higher than the predetermined level when the degree to which the detected pattern data and the reference pattern data coincide with each other is smaller than the threshold value.

4. A coin discriminating method in accordance with claim 2 which further comprises, in the case where a coin is made of a cupronickel system material, a brass system material or a bronze system material, steps of comparing the sum of the bright portion signal intensity average value and dark portion signal intensity average value with a threshold value of coins of a corresponding denomination among threshold values defined for each denomination of coins and discriminating that a damage level of the surface of the coin is equal to or lower than a predetermined level when the sum of the bright portion signal intensity average value and dark portion signal intensity average value is equal to or larger than the threshold value and that the surface of the coin is damaged to higher than the predetermined level when the sum of the bright portion signal intensity average value and dark portion signal intensity average value is smaller than the threshold value, and which further comprises, in the case where a coin is made of an aluminum system material, steps of comparing the sum of the bright portion signal intensity average value and dark portion signal intensity average value with a threshold value of coins of a corresponding denomination among threshold values defined for each denomination of coins and discriminating that the surface of the coin is damaged to higher than the predetermined level when the sum of the bright portion signal intensity average value and dark portion signal intensity average value is equal to or larger than the threshold value and that a damage level of the surface of the coin is equal to or lower than a predetermined level when the sum of the bright portion signal intensity average value and dark portion signal intensity average value is smaller than the threshold value.

5. A coin discriminating method in accordance with claim 3 which further comprises, in the case where a coin is made of a cupronickel system material, a brass system material or a bronze system material, steps of comparing the sum of the bright portion signal intensity average value and dark portion signal intensity average value with a threshold value of coins of a corresponding denomination among threshold values defined for each denomination of coins and discriminating that a damage level of the surface of the coin is equal to or lower than a predetermined level when the sum of the bright portion signal intensity average value and dark portion signal intensity average value is equal to or larger than the threshold value and that the surface of the coin is damaged to higher than the predetermined level when the sum of the bright portion signal intensity average value and dark portion signal intensity average value is smaller than the threshold value, and which further comprises, in the case where a coin is made of an aluminum system material, steps of comparing the sum of the bright portion signal intensity average value and dark portion signal intensity average value with a threshold value of coins of a corresponding denomination among threshold values defined for each denomination of coins and discriminating that the surface of the coin is damaged to higher than the predetermined level when the sum of the bright portion signal intensity average value and dark portion signal intensity average value is equal to or larger than the threshold value and that a damage level of the surface of the coin is equal to or lower than a predetermined level when the sum of the bright portion signal intensity average value and dark portion signal intensity average value is smaller than the threshold value.

6. A coin discriminating method in accordance with claim 3, wherein the detected pattern data and the reference pattern data are mapped in an r-θ coordinate system.

7. A coin discriminating apparatus comprising a coin passage member for supporting a lower surface of a coin, a first transporting belt disposed above the coin passage member adapted for forming a coin passage between the coin passage member and itself and holding the coin between the coin passage member and itself, thereby transporting it, a first light source for emitting light via a first transparent passage portion formed in the coin passage member toward the lower surface of the coin being transported by the first transporting belt on the coin passage member, a first light receiving means for photoelectrically detecting light emitted from the first light source and reflected from the lower surface of the coin via the first transparent portion and producing detected pattern data of the lower surface of the coin, a second transporting belt for supporting the lower surface of the coin, a coin passage forming member disposed above the second transporting belt for forming the coin passage between the lower surface thereof and the second transporting belt and holding the coin between the lower surface thereof and the second transporting belt, thereby transporting it, a second light source for emitting light via a second transparent passage portion formed in the coin passage forming member toward an upper surface of the coin being supported and transported by the second transporting belt, a second light receiving means for photoelectrically detecting light emitted from the second light source and reflected from the upper surface of the coin via the second transparent portion and producing detected pattern data of the upper surface of the coin, a first pattern data storing means for storing the detected pattern data of the lower surface of the coin produced by the first light receiving means, a second pattern data storing means for storing the detected pattern data of the upper surface of the coin produced by the second light receiving means, a reference pattern data storing means for storing reference pattern data of coins of each denomination, a reference damage level data storing means for storing reference damage level data of coins of each denomination, a denomination discriminating means for comparing the detected pattern data of the lower surface of the coin stored in the first pattern data storing means and the reference pattern data of coins of each denomination stored in the reference pattern data storing means by pattern matching and comparing the detected pattern data of the upper surface of the coin stored in the second pattern data storing means and the reference pattern data of coins of each denomination stored in the reference pattern data storing means by pattern matching, thereby discriminating whether or not the coin is acceptable and the denomination of the coin, and a damage level discriminating means for discriminating whether or not the coin is damaged to higher than a predetermined level based on the detected pattern data of the lower surface of the coin stored in the first pattern data storing means and the detected pattern data of the upper surface of the coin stored in the second pattern data storing means, the damage level discriminating means being constituted so as to binarize the reference pattern data of the obverse surface and the reverse surface of the coin of the denomination discriminated by the denomination discriminating means so that "1" is assigned to pixel data having a signal intensity level equal to or higher than a predetermined signal intensity level and "0" is assigned to pixel data having a signal intensity level lower than the predetermined signal intensity level to produce reference bright portion pattern data consisting of "1" pixel data and reference dark portion pattern data consisting of "0" pixel data, extract, based on the thus produced reference bright portion pattern data and reference dark portion pattern data, bright portion pattern data consisting of pixels corresponding to pixels included in the reference bright portion pattern data of the lower surface of the coin from the detected pattern data of the lower surface of the coin and dark portion pattern data consisting of pixels corresponding to pixels included in the reference dark portion pattern data of the lower surface of the coin from the detected pattern data of the lower surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the lower surface of a coin of the denomination discriminated by the denomination discriminating means among threshold values of the obverse surfaces and the reverse surfaces of coins of each denomination stored in the reference damage level data storing means, discriminate that a damage level of the lower surface of the coin is equal to or lower than a predetermined level when the difference between the bright portion data signal intensity average value and dark portion data signal intensity average value is equal to or larger than the threshold value and that the lower surface of the coin is damaged to higher than the predetermined level when the difference between the bright portion data signal intensity average value and dark portion data signal intensity average value is smaller than the threshold value, extract bright portion pattern data consisting of pixels corresponding to pixels included in the reference bright portion pattern data of the upper surface of the coin from the detected pattern data of the upper surface of the coin and dark portion pattern data consisting of pixels corresponding to pixels included in the reference dark portion pattern data of the upper surface of the coin from the detected pattern data of the upper surface of the coin, average signal intensity levels of the pixels included in the bright portion pattern data, thereby calculating a bright portion data signal intensity average value, average signal intensity levels of the pixels included in the dark portion pattern data, thereby calculating a dark portion data signal intensity average value, calculate a difference between the bright portion data signal intensity average value and dark portion data signal intensity average value, compare it with a threshold value of the upper surface of a coin of the denomination discriminated by the denomination discriminating means among threshold values of the obverse surfaces and the reverse surfaces of coins of each denomination stored in the reference damage level data storing means, and discriminate that a damage level of the upper surface of the coin is equal to or lower than a predetermined level when the difference between the bright portion data signal intensity average value and dark portion data signal intensity average value is equal to or larger than the threshold value and that the upper surface of the coin is damaged to higher than the predetermined level when the difference between the bright portion data signal intensity average value and dark portion data signal intensity average value is smaller than the threshold value.

8. A coin discriminating apparatus in accordance with claim 7, wherein the reference pattern data storing means is constituted so as to store the reference bright portion pattern data and the reference dark portion pattern data.

9. A coin discriminating apparatus in accordance with claim 7, wherein the damage level discriminating means is constituted so as to produce the reference bright portion pattern data and reference dark portion pattern data of the lower surface of a coin of the denomination discriminated by the denomination discriminating means and the reference bright portion pattern data and reference dark portion pattern data of the upper surface of a coin of the denomination discriminated by the denomination discriminating means and store the produced data in the reference pattern data storing means.

10. A coin discriminating apparatus in accordance with claim 7, wherein the damage level discriminating means is constituted so as to calculate the sum of the bright portion signal intensity average value and dark portion signal intensity average value and estimate the sum of the bright portion signal intensity average value and dark portion signal intensity average value in accordance with an algorithm for the corresponding denomination, thereby discriminating whether or not the surface of the coin is damaged to higher than a predetermined level and the reference damage level data storing means is constituted so as to store the algorithm for each denomination of coins.

11. A coin discriminating apparatus in accordance with claim 8, wherein the damage level discriminating means is constituted so as to calculate the sum of the bright portion signal intensity average value and dark portion signal intensity average value and estimate the sum of the bright portion signal intensity average value and dark portion signal intensity average value in accordance with an algorithm for the corresponding denomination, thereby discriminating whether or not the surface of the coin is damaged to higher than a predetermined level and the reference damage level data storing means is constituted so as to store the algorithm for each denomination of coins.

12. A coin discriminating apparatus in accordance with claim 9, wherein the damage level discriminating means is constituted so as to calculate the sum of the bright portion signal intensity average value and dark portion signal intensity average value and estimate the sum of the bright portion signal intensity average value and dark portion signal intensity average value in accordance with an algorithm for the corresponding denomination, thereby discriminating whether or not the surface of the coin is damaged to higher than a predetermined level and the reference damage level data storing means is constituted so as to store the algorithm for each denomination of coins.

13. A coin discriminating apparatus in accordance with claim 10, wherein the damage level discriminating means is further constituted so as to compare a degree of pattern matching determined by the denomination discriminating means regarding level of coincidence between the detected pattern data of the lower surface of the coin and the reference pattern data of coins of each denomination stored in the reference pattern data storing means with a threshold value of the lower surface of a coin of the denomination discriminated by the denomination discriminating means among threshold values defined for obverse and reverse surfaces of coins of each denomination, discriminate that a damage level of the lower surface of the coin is equal to or lower than a predetermined level when the degree of the pattern matching is equal to or larger than the threshold value and that the lower surface of the coin is damaged to higher than the predetermined level when the degree of the pattern matching is smaller than the threshold value, compare the degree of pattern matching determined by the denomination discriminating means regarding level of coincidence between the detected pattern data of the upper surface of the coin and the reference pattern data of coins of each denomination stored in the reference pattern data storing means with a threshold value of the upper surface of a coin of the denomination discriminated by the denomination discriminating means among threshold values defined for obverse and reverse surfaces of coins of each denomination, and discriminate that a damage level of the upper surface of the coin is equal to or lower than a predetermined level when the degree of the pattern matching is equal to or larger than the threshold value and that the upper surface of the coin is damaged to higher than the predetermined level when the degree of the pattern matching is smaller than the threshold value.

14. A coin discriminating apparatus in accordance with claim 11, wherein the damage level discriminating means is further constituted so as to compare a degree of pattern matching determined by the denomination discriminating means regarding level of coincidence between the detected pattern data of the lower surface of the coin and the reference pattern data of coins of each denomination stored in the reference pattern data storing means with a threshold value of the lower surface of a coin of the denomination discriminated by the denomination discriminating means among threshold values defined for obverse and reverse surfaces of coins of each denomination, discriminate that a damage level of the lower surface of the coin is equal to or lower than a predetermined level when the degree of the pattern matching is equal to or larger than the threshold value and that the lower surface of the coin is damaged to higher than the predetermined level when the degree of the pattern matching is smaller than the threshold value, compare the degree of pattern matching determined by the denomination discriminating means regarding level of coincidence between the detected pattern data of the upper surface of the coin and the reference pattern data of coins of each denomination stored in the reference pattern data storing means with a threshold value of the upper surface of a coin of the denomination discriminated by the denomination discriminating means among threshold values defined for obverse and reverse surfaces of coins of each denomination, and discriminate that a damage level of the upper surface of the coin is equal to or lower than a predetermined level when the degree of the pattern matching is equal to or larger than the threshold value and that the upper surface of the coin is damaged to higher than the predetermined level when the degree of the pattern matching is smaller than the threshold value.

15. A coin discriminating apparatus in accordance with claim 12, wherein the damage level discriminating means is further constituted so as to compare a degree of pattern matching determined by the denomination discriminating means regarding level of coincidence between the detected pattern data of the lower surface of the coin and the reference pattern data of coins of each denomination stored in the reference pattern data storing means with a threshold value of the lower surface of a coin of the denomination discriminated by the denomination discriminating means among threshold values defined for obverse and reverse surfaces of coins of each denomination, discriminate that a damage level of the lower surface of the coin is equal to or lower than a predetermined level when the degree of the pattern matching is equal to or larger than the threshold value and that the lower surface of the coin is damaged to higher than the predetermined level when the degree of the pattern matching is smaller than the threshold value, compare the degree of pattern matching determined by the denomination discriminating means regarding level of coincidence between the detected pattern data of the upper surface of the coin and the reference pattern data of coins of each denomination stored in the reference pattern data storing means with a threshold value of the upper surface of a coin of the denomination discriminated by the denomination discriminating means among threshold values defined for obverse and reverse surfaces of coins of each denomination, and discriminate that a damage level of the upper surface of the coin is equal to or lower than a predetermined level when the degree of the pattern matching is equal to or larger than the threshold value and that the upper surface of the coin is damaged to higher than the predetermined level when the degree of the pattern matching is smaller than the threshold value.

16. A coin discriminating apparatus in accordance with claim 10, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

17. A coin discriminating apparatus in accordance with claim 11, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

18. A coin discriminating apparatus in accordance with claim 12, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

19. A coin discriminating apparatus in accordance with claim 13, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

20. A coin discriminating apparatus in accordance with claim 14, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

21. A coin discriminating apparatus in accordance with claim 15, wherein the algorithm is defined so that in the case where a coin is made of a cupronickel system material, a brass system material or a bronze system material, when, as a result of comparing the sum of the bright portion signal intensity average value and dark portion signal intensity average value with a threshold value of coins of a corresponding denomination among threshold values defined for each denomination of coins, the sum of the bright portion signal intensity average value and dark portion signal intensity average value is found to be equal to or larger than the threshold value, the damage level of the surface of the coin is discriminated to be equal to or lower than a predetermined level, and when the sum of the bright portion signal intensity average value and dark portion signal intensity average value is found to be smaller than the threshold value, the surface of the coin is discriminated to be damaged to higher than the predetermined value, and that in the case where a coin is made of a aluminum system material, when, as a result of comparing the sum of bright portion signal intensity average value and the dark portion signal intensity average value value with a threshold value of coins of a corresponding denomination among threshold values defined for each denomination of coins, the sum of the bright portion signal intensity average value and dark portion signal intensity average value is found to be equal to or larger than the threshold value, the surface of the coin is discriminated to be damaged to higher than a predetermined value, and when the sum of the bright portion signal intensity average value and dark portion signal intensity average value is smaller than the threshold value, the damage level of the surface of the coin is discriminated to be equal to or lower than a predetermined level.

22. A coin discriminating apparatus in accordance with claim 13, wherein the denomination discriminating means is constituted so as to compare the reference pattern data mapped in an r-θ coordinate system and the detected pattern data mapped in the r-θ coordinate system by pattern matching, thereby discriminating whether or not the coin is acceptable and the denomination of the coin.

23. A coin discriminating apparatus in accordance with claim 14, wherein the denomination discriminating means is constituted so as to compare the reference pattern data mapped in an r-θ coordinate system and the detected pattern data mapped in the r-θ coordinate system by pattern matching, thereby discriminating whether or not the coin is acceptable and the denomination of the coin.

24. A coin discriminating apparatus in accordance with claim 15, wherein the denomination discriminating means is constituted so as to compare the reference pattern data mapped in an r-θ coordinate system and the detected pattern data mapped in the r-θ coordinate system by pattern matching, thereby discriminating whether or not the coin is acceptable and the denomination of the coin.

25. A coin discriminating apparatus in accordance with claim 7 which further comprises a data processing means for effecting edge enhancement processing on the detected pattern data and wherein the denomination discriminating means is constituted so as to compare the reference pattern data and the detected pattern data subjected to edge enhancement processing by pattern matching, thereby discriminating whether or not the coin is acceptable and the denomination of the coin.

* * * * *